United States Patent [19]

Mosher, Jr.

[11] Patent Number: 5,884,328
[45] Date of Patent: Mar. 16, 1999

[54] SYSTEM AND METHOD FOR SYCHRONIZING A LARGE DATABASE AND ITS REPLICA

[75] Inventor: Malcolm Mosher, Jr., Los Gatos, Calif.

[73] Assignee: Tandem Computers, Inc., Cupertino, Calif.

[21] Appl. No.: 920,401

[22] Filed: Aug. 29, 1997

[51] Int. Cl.$^6$ .................................................. G06F 17/30
[52] U.S. Cl. ........................................... 707/202; 707/702
[58] Field of Search .................................. 707/10, 102, 5, 707/202, 702; 395/185, 182.3, 182.4

[56] References Cited

U.S. PATENT DOCUMENTS

| | | | |
|---|---|---|---|
| 5,170,480 | 12/1992 | Mohan et al. ........................... | 707/201 |
| 5,404,508 | 4/1995 | Konrad et al. ........................... | 707/202 |
| 5,455,946 | 10/1995 | Mohan et al. ........................... | 707/202 |
| 5,561,795 | 10/1996 | Sarkar ..................................... | 707/202 |
| 5,615,364 | 3/1997 | Marks ..................................... | 707/202 |
| 5,737,738 | 4/1998 | Sharman ................................ | 707/201 |
| 5,740,433 | 4/1998 | Carr et al. .............................. | 707/202 |

*Primary Examiner*—Paul R. Lintz
*Assistant Examiner*—Ella Colbert
*Attorney, Agent, or Firm*—Gary S. Williams; Flehr Hohbach Test Ablritton & Herbert LLP

[57] ABSTRACT

A primary computer system maintains a master audit trail of changes made to the primary database. A fuzzy database copy of a portion of the primary database is generated by copying the primary database portion using a shared load operation so as to copy the primary database portion without regard to changes being made to the primary database portion while the fuzzy copy is being generated. The fuzzy database copy is installed at a backup computer system. An extractor process executed by the primary computer system extracts audit records from the master audit trail corresponding to the primary database portion, and sends audit information corresponding to extracted audit records to the backup system. The sent audit information includes audit information corresponding to all audit records, including both update and backout audit records, representing changes made to the primary database portion by (A) transactions while the fuzzy database copy was generated, and (B) transactions that were active while the fuzzy database copy was generated and that continue to be active thereafter. The sent audit information also includes audit information corresponding to all audit records representing updates made to the primary database portion by the transactions after the fuzzy database copy was generated. At the backup system the audit information sent by the extractor process is received and applied to the fuzzy database copy so as to generate a synchronized backup database, by performing redos of the database updates corresponding to the audit information sent to the backup system.

10 Claims, 17 Drawing Sheets

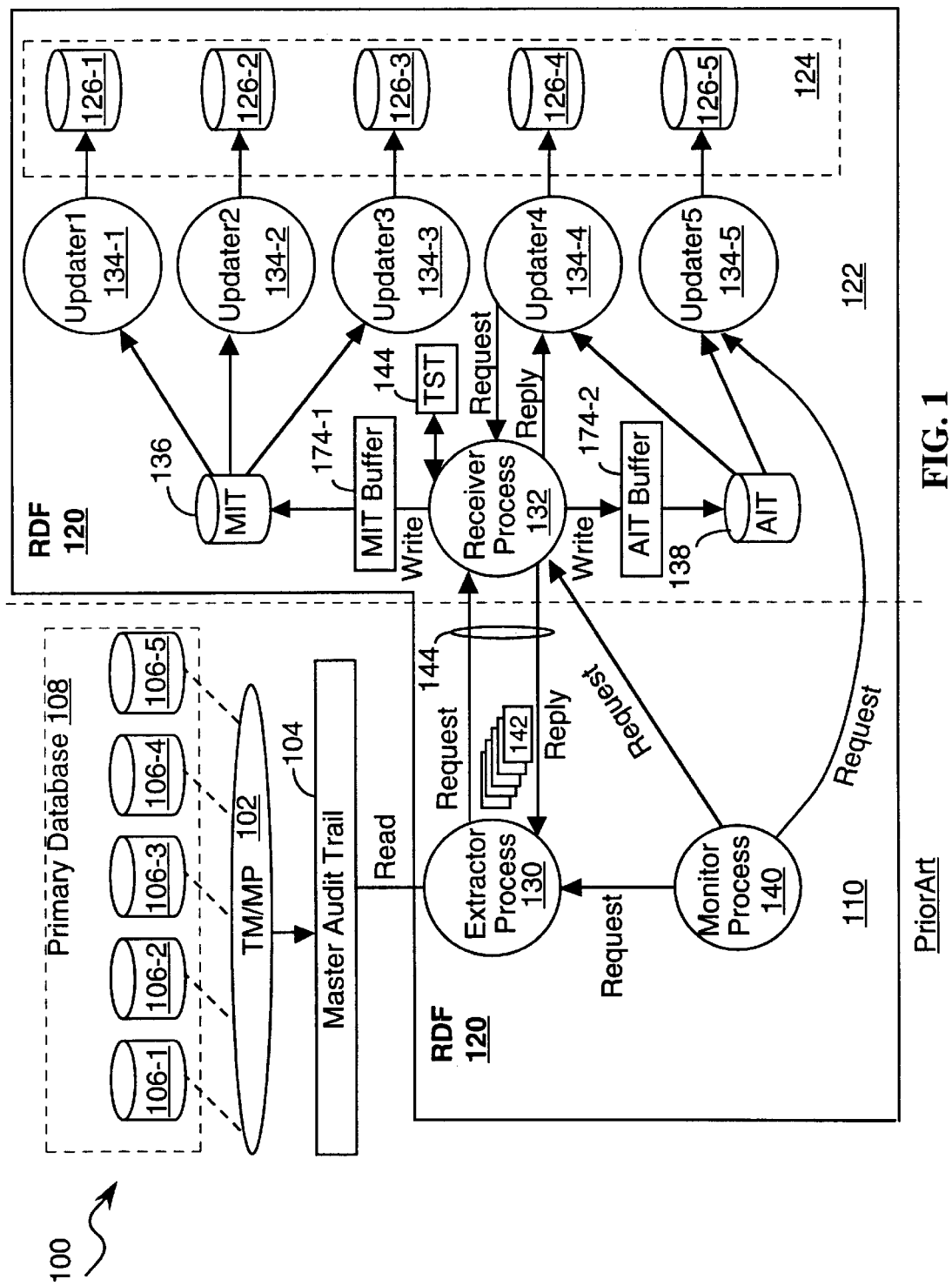
FIG. 1
PriorArt

SYSTEM AND METHOD FOR SYCHRONIZING A LARGE DATABASE AND ITS REPLICA

The present invention relates generally to database management systems having a primary database facility and a duplicate or backup database facility, and particularly to a system and method for initially generating and synchronizing a backup database with a primary database while applications continue to actively modify the primary database.

BACKGROUND OF THE INVENTION

The present invention works in the context of the Tandem "remote data facility" (RDF) technology disclosed in U.S. patent application Ser. No. 08/790,544, filed Jan. 30, 1997, which is hereby incorporated by reference as background information.

The best known and most widely used method of synchronizing a backup database with a primary database uses a procedure sometimes called Backup/Restore (i.e., backing up the database to tape and restoring from tape to a new disk or set of disks). This method generates a snapshot of the database in an internally consistent state, and requires significant downtime for applications on the primary system while the database files are being backed up. As databases have increased considerably in size over the years, the downtime for applications has correspondingly increased when having to backup the database files. Some databases are so large that the Backup/Restore method literally requires weeks to synchronize a backup database with its primary database. Since the applications on the primary system must be turned off during this entire process, this is not an acceptable solution in most situations.

As an alternative, a backup database can be generated by detaching one disk of each mirrored pair in their primary system and then reviving these mirrors against unmirrored disks on their backup systems. This method can be accomplished relatively quickly but also carries some risk that many database customers are unwilling to take. For example, after having detached the mirror ($A') on the primary, one would roll in a new disk and revive it against the existing disk ($A). If, however, one encountered any hardware problems in reviving $A' and if one was unwilling to run one's applications on unmirrored disks, then one could be faced with an extended outage, depending on the nature of the hardware failure.

Increasingly, customers with massive databases are insisting that they cannot bring their applications down at all. That is, the backup database has to be generated, initialized and synchronized with the primary database without having any impact whatsoever on the applications that are using and modifying the primary database, and further these customers are unwilling to risk running the primary system without mirrored disks.

A different but related problem involves the case where one has temporarily lost one's primary system, switched operations to the backup system, and has been running the applications at that backup system for some time. When the original primary system comes back online, how does one synchronize the databases? If the outage on the primary was planned, then there is a standard procedure whereby one can bring the database on the primary back into synchronization with the database on the backup system. Essentially, the primary system is resynchronized with the backup system by creating and storing the audit records for all committed transactions performed on the backup system, and then performing "redo" operations for those audit records on the primary system.

If, however, the outage was unplanned, then when the primary comes back online, one must perform a full database synchronization.

Previously considered solutions all boil down to the common theme of developing a program that would open database files, create duplicates on the remote system, and then read through the primary system's files, deleting and re-inserting each record.

Because the files are audited, the deletes and inserts would generate audit records that would be sent to the backup system, and then applied to the backup database. Due to the number of disk operations required, and the use of record locks that compete with record locks by the applications, the delete/insert technique is very time consuming.

There are well known problems with this technique. As an example of the type of problem caused by this technique, suppose an application updates a record in a given file before the delete/insert program replicates the record on the backup system. The Updater will encounter a file system error when attempting to apply that update because the record does not even exist in the backup database file yet. Should this error be suppressed? The delete/insert technique will also produce an error when the Updater applies the delete operation of a delete/insert pair because the record does not yet exist in the backup database. Should one suppress all such errors, since these errors are really just expected parts of the replication process? How does one inform the Updater when to suppress such errors and when not to suppress them?

There are undoubtedly ways to solve all problems associated with this delete/insert method of database synchronization, but it is not clear that even all the problems with it have been identified yet, and some of the known problems remain unsolved.

Taking into account bandwidth requirements, the amount of time it would take the delete/insert program to perform all its tasks, and the amount of time it would take to transmit the resulting audit records to the backup system and apply it to the backup system, the time required to complete database synchronization would be considerable. Performing this synchronization method on a system that is performing hundreds of transactions per second will obviously slow down the synchronization process further. It is estimated that the delete/insert synchronization method would likely take weeks to complete for a database of a few hundred gigabytes. Clearly, such a long database synchronization time is unacceptable.

It is a goal of the present invention to provide a system and method for generating and synchronizing a backup database with a primary database efficiently and relatively quickly, even when the database being replicated has hundreds of gigabytes of data.

Another object of the present invention is to provide a system and method for creating a fuzzy copy of a primary database, to be used as a backup database, and for then efficiently synchronizing the fuzzy backup database with the primary database.

SUMMARY OF THE INVENTION

In summary, the present invention is a method of synchronizing a backup database with a corresponding primary database while one or more application programs continue to perform transactions that modify the primary database. A primary computer system maintains a master audit trail of changes made to the primary database. The master audit trail includes update audit records representing any changes made to the primary database by application transactions, backout audit records representing undo's or backouts of changes made to the primary database when some of the transactions abort, and transaction status records that indicate whether a transaction committed, aborted or is still active.

A fuzzy database copy of a portion of the primary database is generated by copying the primary database portion without regard to changes being made to the primary database portion while the fuzzy copy is being generated. The fuzzy database copy is then installed at a backup computer system.

An Extractor process executed by the primary computer system extracts audit records from the master audit trail corresponding to the primary database portion, and sends audit information corresponding to extracted audit records to the backup system. The audit information sent to the backup system includes audit information corresponding to all audit records, including both update and backout audit records, representing changes made to the primary database portion by (A) transactions while the fuzzy database copy was generated, and (B) transactions that were active while the fuzzy database copy was generated and that continue to be active thereafter. After the process of generating the fuzzy database copy is completed, the Extractor resumes normal operations, sending only update, commit and abort audit records to the backup system. Backout audit records are not sent to the backup system when the Extractor during normal operation.

At the backup system the audit information sent by the Extractor process is received and applied to the fuzzy database copy so as to generate a synchronized backup database, by performing redos of the database updates corresponding to the audit information sent to the backup system. While the backup system normally applies update audit to the backup database only for transactions that committed, during database synchronization the backup system also applies update and backout audit to the backup database for transactions that aborted.

More specifically, for audit information corresponding to the transactions that were active while the fuzzy database copy was being generated (including both transactions that committed and those that aborted), redos are performed for all database changes represented by the audit information, including both updates and update backouts. For audit information corresponding to transactions started after generation of the fuzzy database copy was completed, normal processing resumes and redos are performed only for database updates represented by the received audit information for transactions that committed.

BRIEF DESCRIPTION OF THE DRAWINGS

Additional objects and features of the invention will be more readily apparent from the following detailed description and appended claims when taken in conjunction with the drawings, in which:

FIG. 1 is a block diagram of a prior art database management system with a remote duplicate database facility.

DESCRIPTION OF THE PREFERRED EMBODIMENTS

Description of Tandem RDF System Prior to the Present Invention

Figure 2:
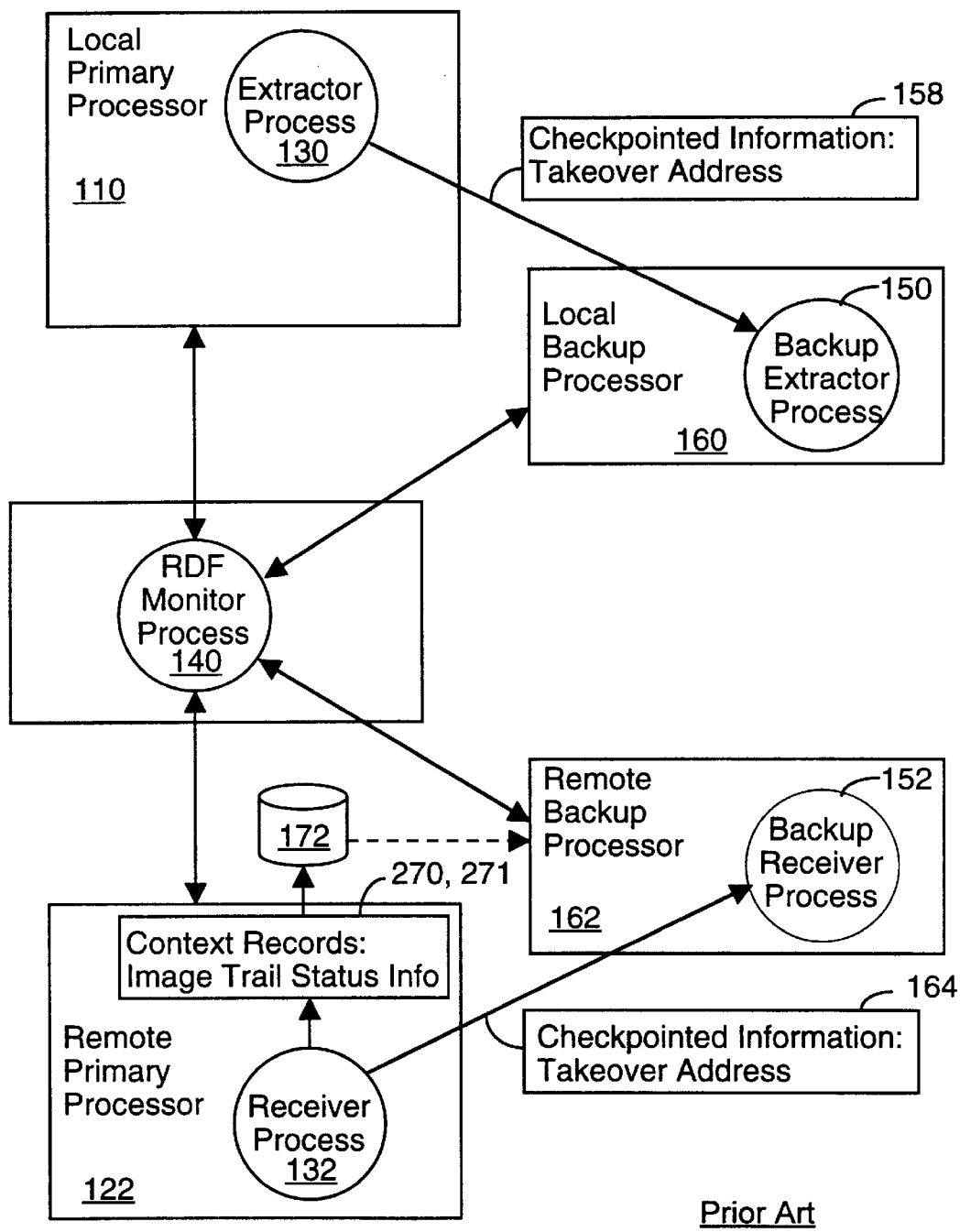
FIG. 2 is a conceptual representation of the checkpoint, context save, and failover procedures used by the system shown in FIG. 1.

FIG. 1 represents the basic architecture of Tandem Computer's RDF system prior to the present invention, while FIG. 2 shows the relationship between some of the RDF processes and their respective local backup processes. A more detailed description of the prior art Tandem Computer RDF system can be found in U.S. patent application Ser. No. 08/790,544, filed Jan. 30, 1997, entitled Remote Duplicate Database Facility with Triple Contingency Protection, which is hereby incorporated by reference as background information.

In Tandem transaction processing systems each process has a respective local backup process which is automatically invoked if the primary process fails. Each local backup process is located on a different CPU than its respective primary process, and provides a first level of fault protection. A primary purpose of the RDF (remote data facility) system is to handle failures in the primary system that cannot be resolved through the use of local backup processes (and other local remedial measures), such as a complete failure of the primary system.

The computer system 100 shown in FIG. 1 has a transaction management facility (TMF) 102 that writes audit entries to a master audit trail (MAT) 104. The audit entries indicate changes made to "audited files" on "RDF protected volumes" 106 of a primary database 108 on a primary processor 110. All RDF protected volumes are configured to write all transaction audit records to the MAT 104.

The RDF system 120 includes processes on both the local processors 110, 160 and a remote backup processors 122, 162. The RDF 120 maintains a replicated database 124 (also called the backup database) by monitoring changes made to "audited files" on "RDF protected volumes" 106 on a primary system and applying those changes to corresponding backup volumes 126 on the backup computer system 122. An "audited file" (sometimes called an "RDF audited file") is a file for which RDF protection has been enabled, and an "RDF protected volume" is a logical or physical unit of disk storage for which RDF protection has been enabled.

On the primary processor 110, an RDF Extractor process 130 reads the master audit trail (MAT) 104, which is a log maintained by the transaction management facility (TM/MP) of all database transactions that affect audited files, and sends any audit records associated with RDF-protected volumes to an RDF Receiver process 132 on the backup computer system.

The MAT 104 is stored as a series of files with sequentially numbered file names. The MAT files are all of a fixed size (configurable for each system), such as 64 Mbytes. The TMF 102 and Extractor 130 both are programmed to progress automatically (and independently) from one MAT file to the next.

The Extractor Process—Overview

Figure 4:
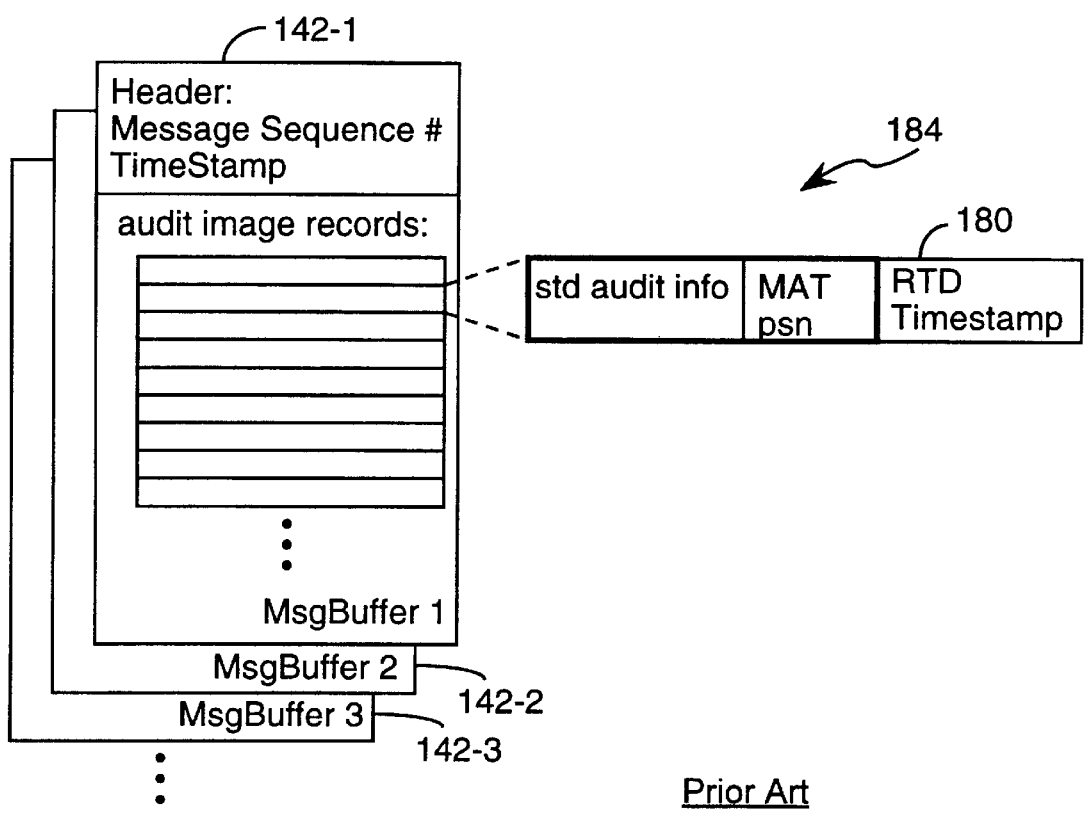
FIG. 4 depicts data structures used by the Extractor process in the system shown in FIG. 1.

Referring to FIGS. 1 and 4, the Extractor process 130 adds a MAT position value and a timestamp to each audit record that it extracts from the master audit trail 104 and that is associated with a protected volume. The MAT position value is the position in the MAT of the extracted audit record. The added timestamp is known as the RTD timestamp 180. The added timestamp is the timestamp of the last transaction to complete prior to generation of the audit record in the MAT 104. The resulting record is called an audit image record, or image record 184. The Extractor process stores each audit image record in message buffers 142, each having a size of about 28K bytes in the preferred embodiment.

The Extractor process uses two to eight message buffers 142, with four message buffers being a typical configuration. After filling and transmitting a message buffer 142 to the Receiver process via a communication channel 144, the Extractor process 130 does not wait for an acknowledgment reply message from the Receiver process 132. Rather, as long another message buffer is available, it continues processing audit records in the MAT 104, storing audit image records in the next available message buffer 142. Each message buffer 142 is made unavailable after it is transmitted to the Receiver process 132 until a corresponding acknowledgment reply message is received from the Receiver process 132, at which point the message buffer 142 becomes available for use by the Extractor process 130.

The Extractor process 130 performs a single checkpoint operation during startup of the Extractor process, and that checkpoint 158 only sends a takeover location to the backup Extractor process 150. (See FIG. 2.) It also does not durably store a context record. Rather, the Extractor process 130 relies on information received from the Receiver process 132 when RDF is either starting up or restarting, as will be explained in more detail below, as well as during an RDF startup.

The Receiver Process—Overview

The Receiver process 132 immediately acknowledges each received message buffer. No processing of the message buffer is performed before the acknowledgment is sent. The RDF system provides tight synchronization of the Extractor and Receiver processes and provides for automatic resynchronization whenever a start or restart condition occurs. For example the two processes will resynchronize whenever either process is restarted or has a primary process failure, and whenever the Receiver process receives audit records out of order from the Extractor process.

The Receiver process 132 sorts received audit records such that (A) commit/abort records are stored only in the master image trail 136, and (B) each database update audit record is moved into only the one image trail 136, 138 corresponding to the only Updater process 134 that will potentially use that audit record to update data stored on a backup volume 126.

The Receiver process includes a separate "double buffer" for each image trail. In the preferred embodiment, each image trail has two 56K byte buffers that are used in alternating fashion. Each image trail buffer 174 is structured as fourteen blocks of length 4K bytes.

The Receiver process 132 writes commit/abort records received from the Extractor to the master image trail 136. Additionally, it stores data indicating the outcome of each transaction, i.e., commit or abort, to a transaction status table (TST) 144. Thus the Receiver can access the TST 144, which is stored in memory, to determine the status of each transaction that has either committed or aborted without having to access records in the master image trail, which is stored on disk.

The Receiver process performs a single checkpoint operation during startup of the Receiver process, and that checkpoint 164 only sends a takeover location to the backup Receiver process 152. (See FIG. 2.) However, it does periodically (e.g., once every 5 to 25 seconds) durably store a Receiver context record 270 and a set of Image Trail context records 271 on a nonvolatile (disk) storage device 172. The context records 270, 271 stored by the Receiver process 132 are quite small, consisting primarily of a few values for each image trail.

In normal operation, when the RDF system is first initialized, the Receiver process creates and initializes a context record for each Updater.

Updater Processes—Overview

Each RDF-protected volume 106 on the primary computer system 110 has its own Updater process 134 on the backup computer system 122 that is responsible for applying audit image records to the corresponding backup volume 126 on the backup computer system 122 so as to replicate the audit protected files on that volume. Audit image records associated with aborted transactions on the primary system are never applied to the database on the remote backup computer system 122.

The audit image records in each image trail 136, 138 are typically read and processed by two to ten Updaters 134. Each Updater 134 reads all the audit image records in the corresponding image trail, but utilizes only the audit image records associated with the primary disk volume 106 for which that Updater is responsible.

Since the Updaters 134 only initiate redo operations on the audit image records for transactions that have committed, the Updaters 134 require the transaction status information in the transaction status table 144. To obtain that information, each Updater 134 requests transaction status information from the Receiver process 132 whenever it reads an audit image record for a database table that the Updater is assigned to replicate and for which the transaction status is unknown to the Updater.

The Receiver process 132, in response to each status request, sends the requesting Updater process 134 a message that includes not only the status of the transaction identified in the status request, but also the status of the next two hundred or so transactions in the transaction status table 144 that completed after the identified transaction. If the Receiver process 132 does not yet know the status of the identified transaction, it does not respond to the status request until it receives a commit/abort record concerning the identified transaction.

At periodic intervals, each Updater flushes database updates to disk, and durably stores its current image trail position and an associated master image trail position to disk in a context record. The saved image trail position, called the Restart IT position, indicates that the Updater has no further need for image trail records at earlier positions.

As each Updater process reads a new block of image data, it extracts from the block's header a master image trail (MIT) position. Whenever an Updater process sends a request to the Receiver process, it reports to the Receiver process the Restart MIT position and the Restart image trail file position in the Updater's last durably stored context record.

The reported Restart MIT position is used by the Receiver process 132 to determine which portions of the transaction status table 144 are no longer needed and thus can be discarded. The reported Restart MIT position is also used to determine which MIT files can be discarded. The reported image trail position is used by the Receiver process 132 to determine which image trail files have been processed by all the Updaters assigned thereto and thus can be deleted.

When an Updater process 134 reaches the end of file of the image trail 136,138 to which it is assigned, it performs a wait for a preselected amount of time, such as two to ten seconds before attempting to read more audit image records.

Monitor Process—Overview

Monitor process 140 and another process called RDF-COM (which will be collectively referred to as the Monitor for the purpose of this document) are is used to coordinate tasks performed in response to user commands to the RDF system.

RDF Configuration File

Figure 3:
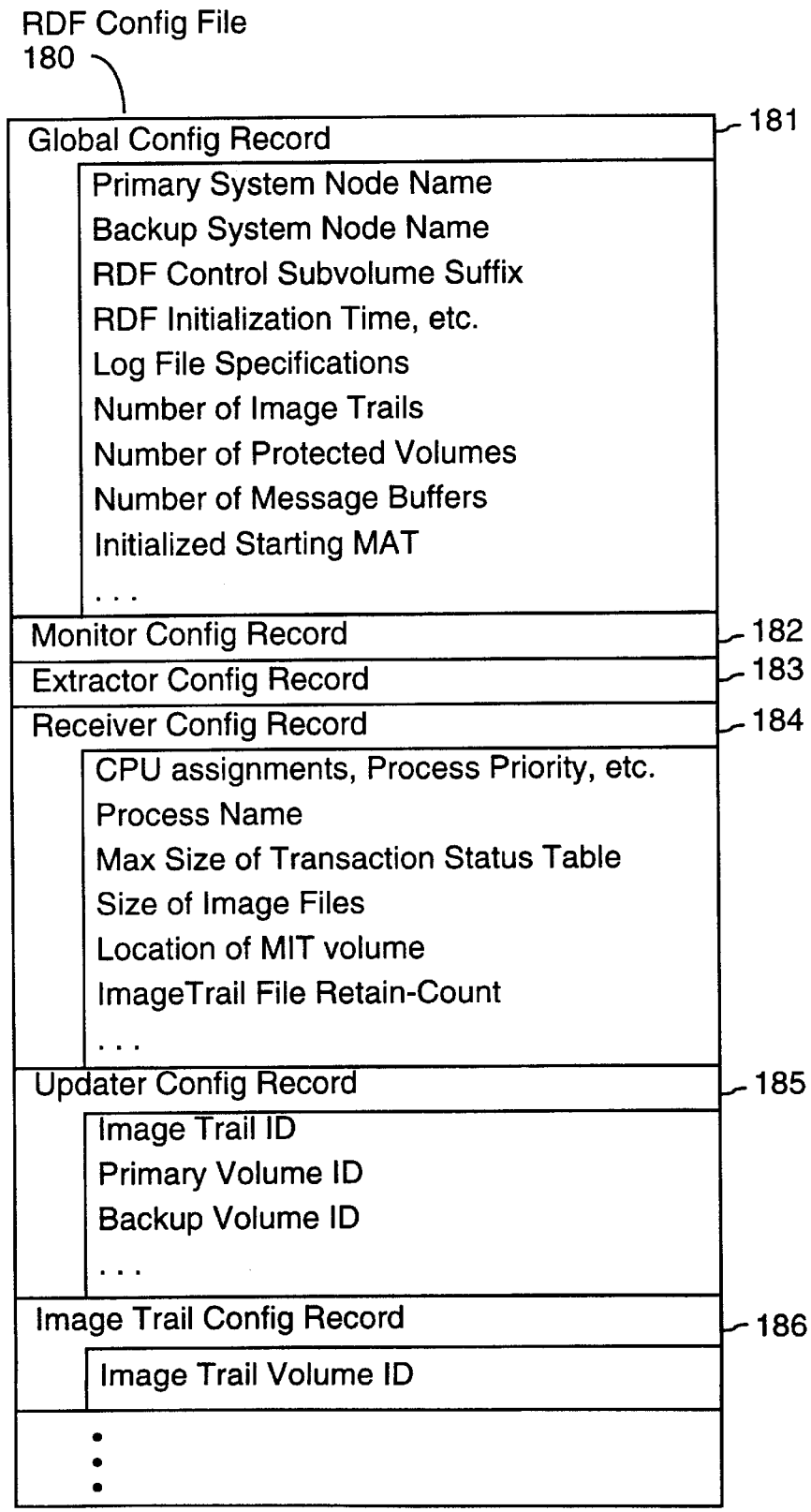
FIG. 3 is a schematic representation of the configuration file used to define the configuration of each RDF system in the system shown in FIG. 1.

Referring to FIG. 3, the structure of each RDF system 120 is represented by a configuration file 180 that is stored on the control volume of the primary system 110 and the control volume of the backup system 122 associated with the RDF system. The RDF configuration file 180 includes one global RDF configuration record 181; one Monitor configuration record 182 for identifying characteristics of the RDF system's Monitor process; one Extractor configuration record for 183 for identifying characteristics of the RDF system's Extractor process; one Receiver configuration record 184 for identifying characteristics of the RDF system's Receiver process; one Updater configuration record 185 for each of the RDF system's Updaters, for identifying characteristics of the corresponding Updater process; and one Image Trail configuration record 186 for each image trail in the backup system.

The information stored in the global RDF configuration record 181 includes:
the node name of the primary system;
the node name of the backup system;
the control subvolume used by the RDF system;
the time that the RDF system was initialized;
the name and location of the RDF system's log file;
the number of image trails in the backup system;
the number of protected volumes, which is also the number of Updaters in the backup system;
the number of message buffers used by the RDF system; and other information not relevant here.

Each of the process configuration records 182-185 includes information identifying the CPUs on which that process and its backup runs, the priority assigned the process, the name of the process, and so on. In addition, the Receiver configuration record 184 also specifies the maximum size of the transaction status table (which is described below), the size of each of the image trail files, the volume used to store the master image trail files, and a parameter called the image trail retain count, which indicates the number of image trail files to be retained for each image trail.

The Updater configuration records 185 each identify the image trail from which the associated Updater process is to read audit information, the primary volume whose audit information is to be processed by the Updater, and the backup volume to which database updates are to be applied by the Updater.

Each Image trail configuration record 186 identifies the disk volume on which the image trail files for the corresponding image trail are to be stored.

Identical copies of the RDF system's entire configuration file are stored on the primary 110 system and backup system 122. The context file used to store context records (for the Receiver and Updater processes), exceptions file and image files (for storing the image trail records) are stored only on the backup system.

Audit Record Types

The master audit trail (MAT) 104 contains the following types of records:

Update records, which reflect changes to a database volume made by a transaction. Each update record indicates the transaction ID of the transaction that made the database change and the identity of the database volume that has been updated.

Backout records, which reflect the reversal of previous changes made to a database volume. The database changes represented by backout records are sometimes herein called update backouts. Backout audit records are created when a transaction is aborted and the database changes made by the transaction need to be reversed. Each backout record indicates the transaction ID of the transaction that made the database change and the identity of the database volume that has been modified by the update backout.

Transaction status records, including commit and abort records, and transaction active records. Commit and abort records indicate that a specified transaction has committed or aborted. Transaction active records (also sometimes called transaction alive records) indicate that a transaction is still active. Each transaction status record indicates the transaction ID of the transaction whose status is being reported. Every active transaction is guaranteed to produce one transaction status record during each TMP control time frame (i.e., between successive TMP control points). A transaction active record is stored in the master audit trail if the transaction does not commit or abort during a TMP control time frame.

TMP control point records, which are "timing markers" inserted by the TMF 102 into the master audit trail at varying intervals depending on the system's transaction load. During heavy transaction loads, TMP control point records may be inserted less than a minute apart; at moderate transaction loads the average time between TMP control point records is about 5 minutes; and under very light loads the time between TMP control point records may be as long as a half hour. The set of audit records between two successive TMP control point records are said to fall within a "TMP control time frame".

Other records not relevant to the present discussion.

Image Records

Image records are discussed above with reference to FIG. 4 in "The Extractor Process—Overview" section of this document, above.

Figure 5:
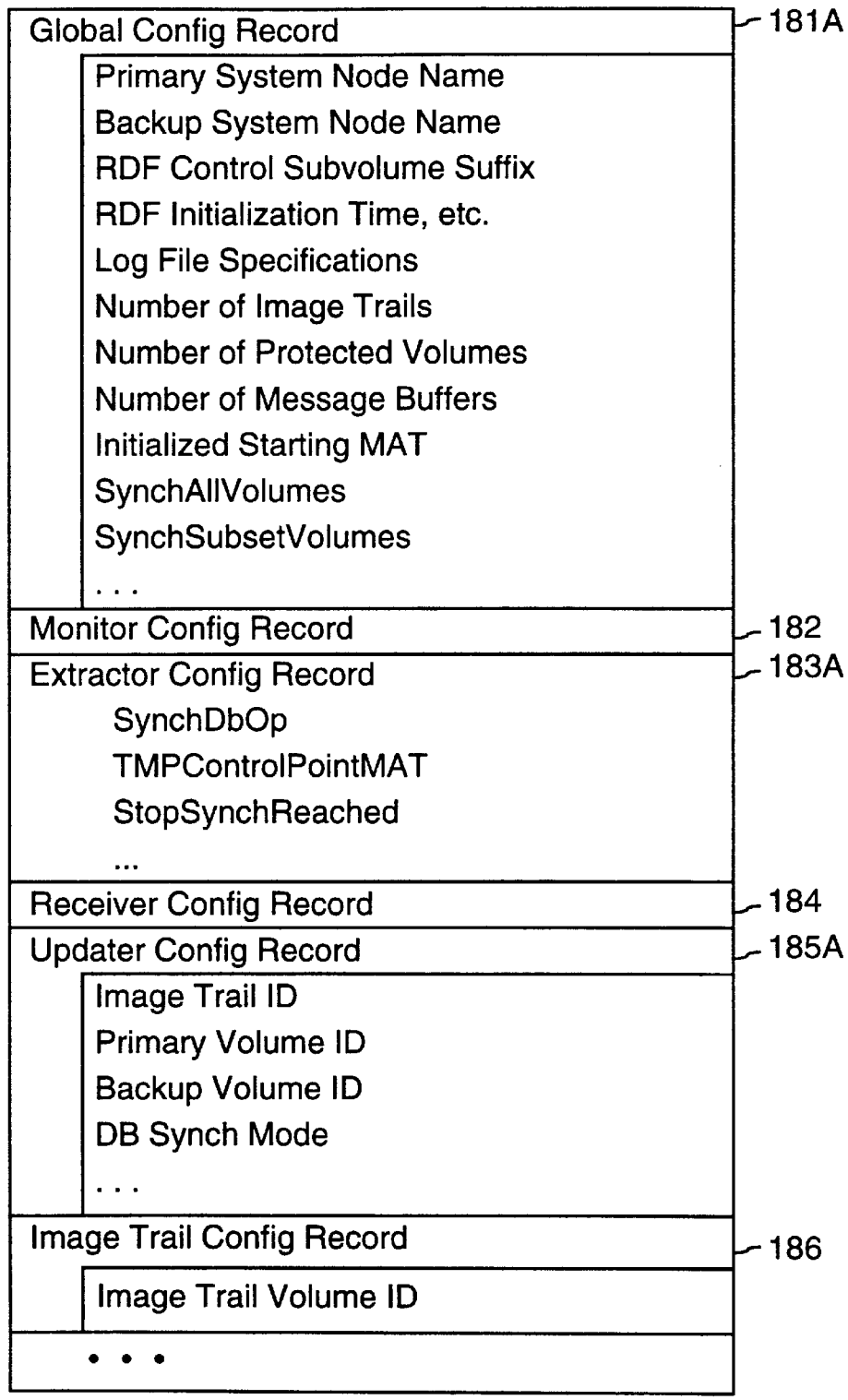
FIG. 5 is a schematic representation of the configuration file used to define the configuration of each RDF system in a preferred embodiment of the present invention.

New and Revised RDF Data Structures For Handling On-Line Database Synchronization Referring to FIG. 5, additional fields have been added to the global configuration record 181A, the Extractor configuration record 183A and each of the Updater configuration records 185A. The new fields in the global configuration record 181A are:

SynchAllVolumes, which is a flag that is set to True when all of the RDF protected volumes are being synchronized; and SynchSubsetVolumes, which is an integer parameter, used only for partial database synchronization, that is set to the number of database volumes being synchronized; this parameter is preferably set to zero if all the RDF protected volumes are being synchronized.

The new fields in the Extractor configuration record 183A are:

SynchDbOp, which is a flag that is set to True when any (complete or partial) database synchronization operation is being performed;

TMPControlPointMAT, which is set by the Extractor process during database synchronization to point to the last TMP control point audit record processed by the Extractor before it performs a special operation to finish phase one of the database synchronization process; and StopSynchReached, which is a flag that is set to True by the Extractor when it receives a Stop Synch message from RDFCOM; the Stop Synch message is generated by RDFCOM in response to an operator command that is manually entered after a complete fuzzy backup copy has been made of the database volumes being synchronized.

A new field added to the Updater configuration record 185A for each Updater on the backup system is DbSynchMode, which is a flag that is set to True when the associated Updater process is participating in a (complete or partial) database synchronization operation.

Figure 6:
FIG. 6 depicts additional data structures used by the Extractor process in a preferred embodiment of the present invention.

Referring to FIG. 6, the following additional global parameters are stored in memory by the Extractor process:

SynchDbOp 202, which is a flag that is a copy of the SynchDbOp flag in the Extractor configuration record;

UseTST 203, which is a flag that indicates when active transactions are to be added to an Extractor transaction table 210;

CheckTST 204, which is a flag that indicates when the Extractor transaction table is used by the Extractor to determine which backout audit records to send to the backup system;

WaitingOnSynchComplete 205, which is a flag that is set to True when the Extractor has sent all audit information required to synchronize a set of backup database volumes with the respective primary database volumes and the Extractor is waiting to hear from the remote backup system that all of the audit information required to complete the synchronization process has been committed to disk (i.e., durably stored in the Image trails) by the Receiver process;

Synch1Done 206, which is a flag that is set after the first synchronization phase at the Extractor process is completed (i.e., when the initial generation of the extractor transaction table is completed);

SynchMAT 207 denotes the MAT position of the TMP control point record after the second phase of the synchronization process is completed, at which point all audit information needed to complete synchronization of the backup database with the primary database has been sent by the Extractor to the backup system;

NumTSTentries 208 indicates the number of transaction IDs currently stored in the extract transaction table (E-TST);

Extractor transaction table (E-TST) 210 is a table listing transactions for which backout audit information must be sent to the remote backup system during the second phase of the synchronization process.

Figure 7:
FIG. 7 depicts the context record used by each Updater process in a preferred embodiment of the present invention.

Referring to FIG. 7, a DbSynchMode field 574F and a ReportDbSynch flag 574G have been added to the context record 570 for each Updater process. These flags are set to True when (A) the receiver process initializes the Updaters at the beginning of a full database synchronization, or (B) by RDFCOM at the during a partial database synchronization for Updater that is participating the partial database synchronization.

On-Line Database Synchronization

In a preferred embodiment, the present invention does not consist of a single program or operation, but rather a series of steps that can best be described as a protocol. This protocol makes use of existing mechanisms and structures in the Tandem RDF system to synchronize a backup database without having to stop TMF or stop the applications that use the primary database.

The steps of the database synchronization protocol in the preferred embodiment will be explained next with reference to the "time lines" shown in FIGS. 8A and 8B, the main flow chart shown in FIGS. 9A, 9B and 9C, and detailed flow charts on specific aspects of the Extractor and Updater processes shown in FIGS. 10, 11A, 11B, 11C, 12A, 12B, 13A and 13B.

Figure 8A:
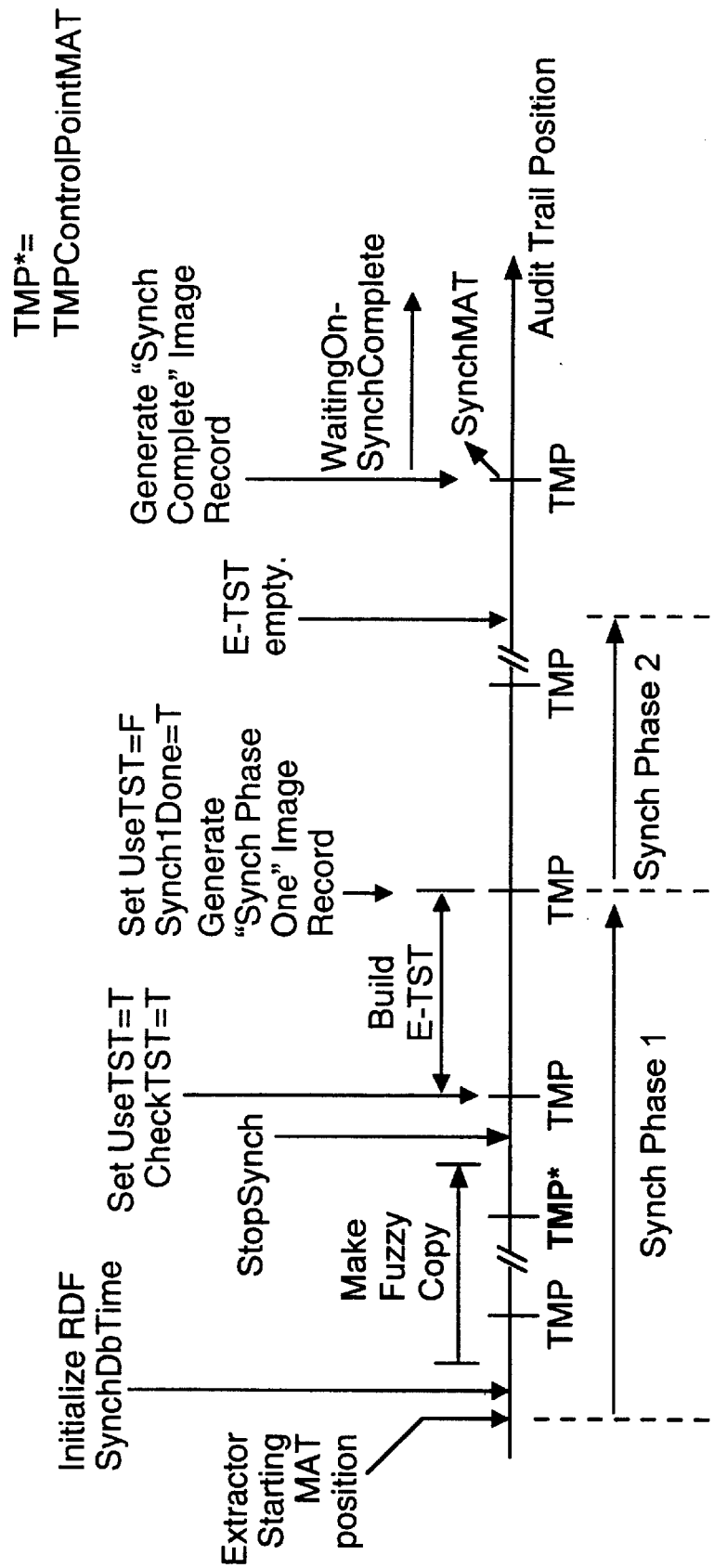
FIGS. 8A and 8B depicts audit trail position "time lines" of milestones and phases of the database synchronization protocol in the primary and backup systems, in a preferred embodiment of the present invention.
Figure 8B:
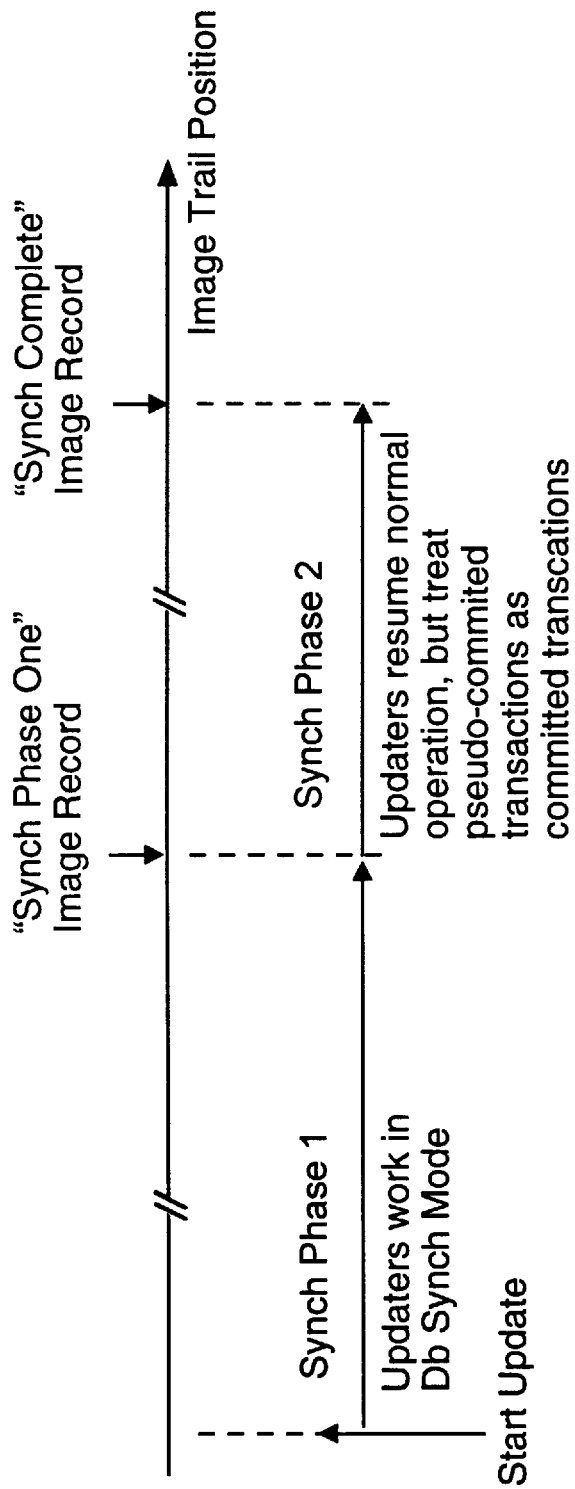
Figure 9A:
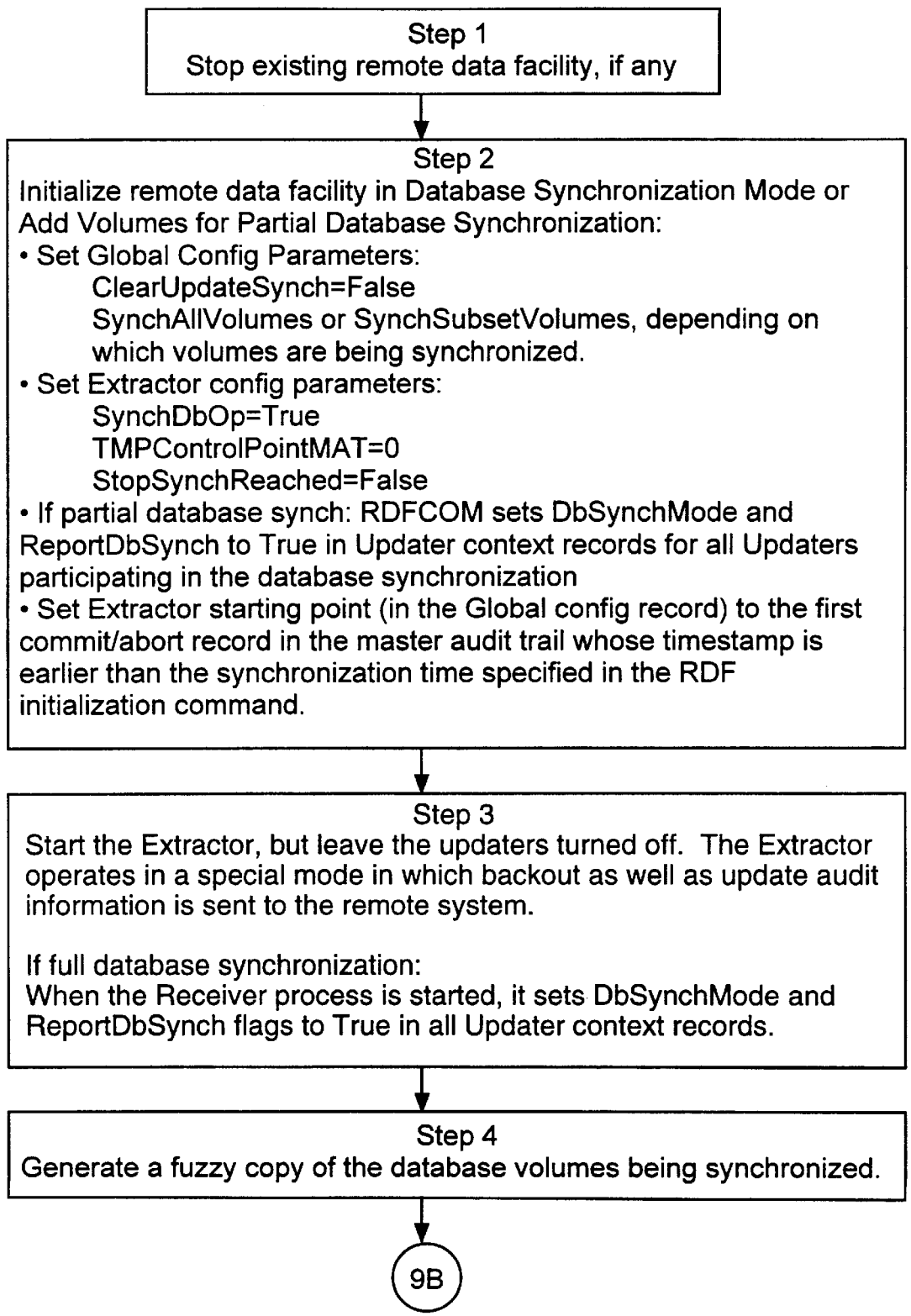
FIGS. 9A, 9B and 9C depict the main steps of the database synchronization protocol in a preferred embodiment of the present invention.
Figure 9B:
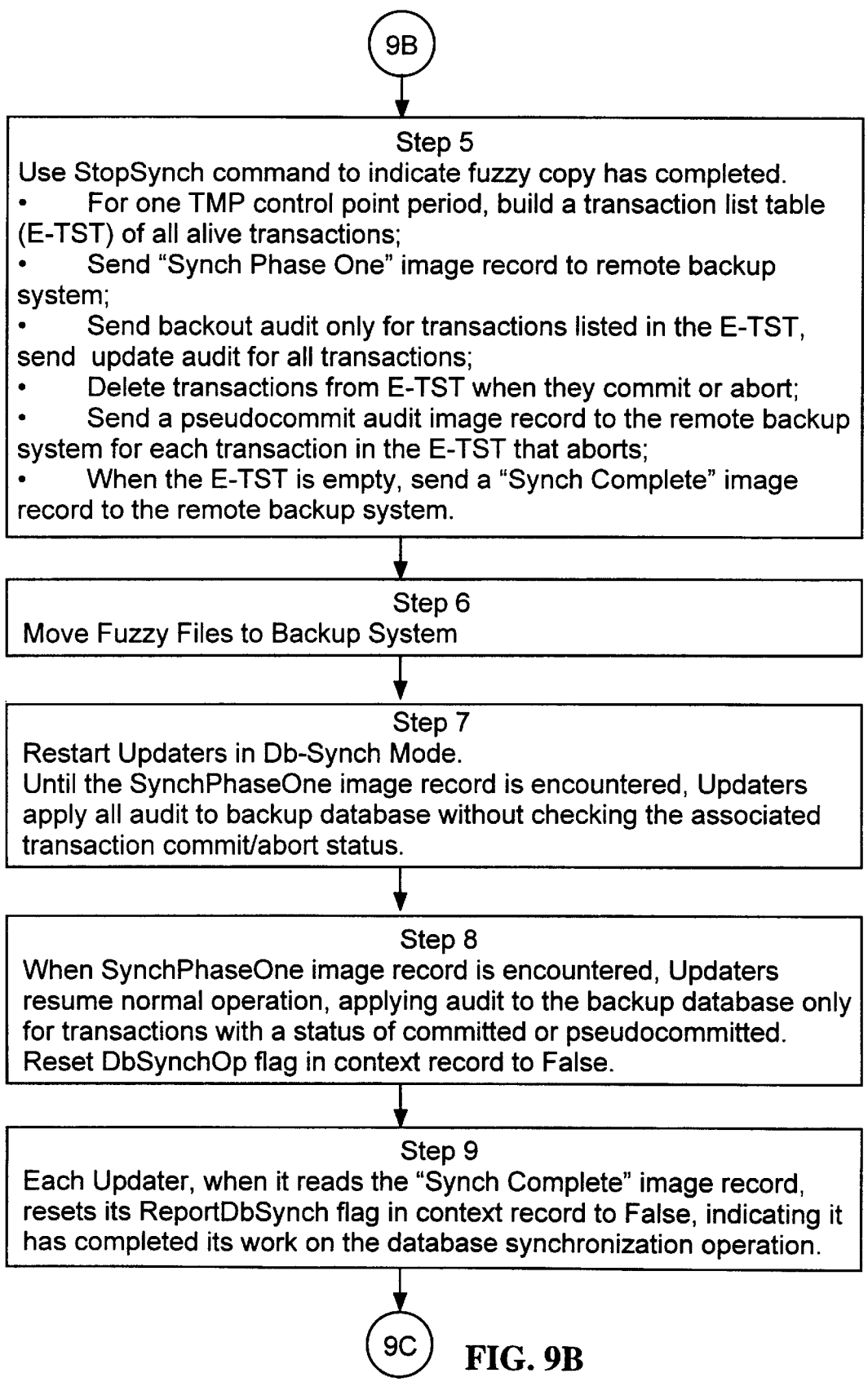
Figure 9C:
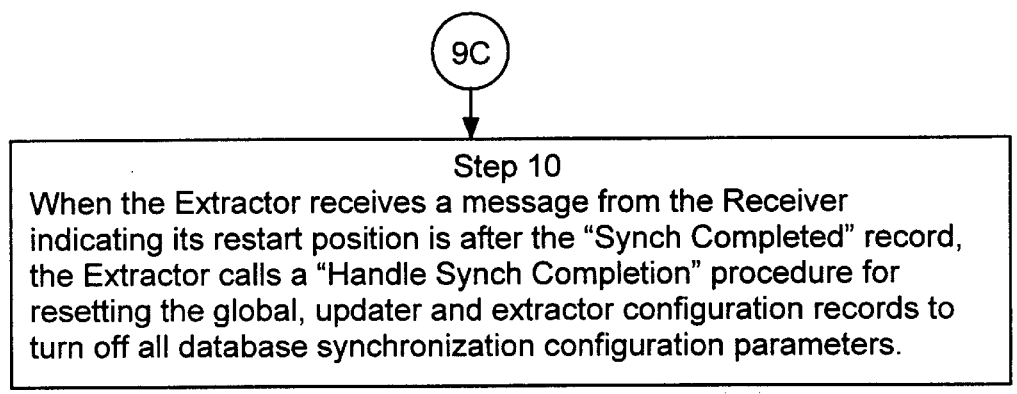

It should be noted that the "time lines" in FIGS. 8A and 8B are not regular time lines. FIG. 8A shows the sequence of protocol steps taken with respect to the positions of records in the master audit trail, and FIG. 8B does the same with respect to positions in the image trail. The "TMP" markers on the MAT "time line" in FIG. 8A indicate the TMP control point records that are inserted into the master audit trail by the TMF at varying intervals (as explained earlier in this document). Furthermore, each phase or portion of the protocol is performed by the Extractor process long before the corresponding audit information is processed by the Updaters on the backup system.

As will be explained in more detail below with respect to FIGS. 11A and 11B, the TMP control point records are used by the Extractor as the points at which to check the progress of the database synchronization process and to update control parameters so as to move the database synchronization process from one phase to another as various steps of the process are completed.

Step 1 Stop Existing Remote Data Facility, If Any

If RDF is currently running, the system operator issues the STOP RDF command to the RDFCOM process. This stops all aspects of the RDF system, including the Extractor process in the primary system, the Receiver process and the Updater processes in the backup system. If the RDF system does not yet exist or is not running, this step is not needed.

Step 2 Initialize Remote Data Facility In Database Synchronization Mode

An RDFCOM command is entered by the system operator to initialize a new RDF system without stopping the TMF and application processes. An example of the command is as follows:

Initialize RDF, BackupSystem /bksys, SynchDbTime 17 May. 1996 09:00

This RDF initialization command allows a RDF system to be initialized without having to stop TMF and application processes. There are no special considerations required for specifying the timestamp (i.e., the value following the SynchDbTime command parameter) except that it must be earlier than the current time at which the command is executed). In response to this initialization command, RDFCOM performs a reverse scan of the master audit trail in search of the first commit/abort record whose timestamp is earlier than the timestamp specified in the Initialize RDF command. It then sets the starting position of the Extractor to that commit/abort record.

Secondly, the Initialize RDF command, when used with the SynchDbTime option, causes the RDFCOM process to initialize parameters in the global configuration record 181A (see FIG. 5) as follows:

SynchAllVolumes is set to True if all of the RDF protected volumes are being synchronized and is otherwise set to False;

SynchSubsetVolumes is set to the number of database volumes being synchronized; this parameter can be set to zero if all the RDF protected volumes are being synchronized; and InitializedStartingMAT is set to the first commit/abort record whose timestamp is earlier than the timestamp specified in the Initialize RDF command.

The SynchDbTime option of the Initialize RDF command also causes the RDFCOM process to initialize parameters in the Extractor configuration record 183A (see FIG. 5) as follows:

the SynchDbOp flag is set to True to indicate a database synchronization operation is being performed;

the TMPControlPointMAT parameter is set to zero; and the StopSynchReached flag is set to False.

In addition, when the Extractor process enters its volatile initialization process, it will read the Extractor configuration record to see if the SynchDbOp flag is set to True, and upon detecting that SynchDbOp is set to True, it initializes the global parameters in the Extractor process as follows:

the SynchDbOp flag 202 is set to True to indicate a database synchronization operation is being performed;

the UseTST flag 203 and CheckTST flag 204 are both set to False because the Extractor transaction table is not used until later in the database synchronization process;

the WaitingOnSynchComplete flag 205 and Synch1Done flag 206 are both set to False because these flags are used to indicate completion of later portions of the database synchronization process;

SynchMAT 207 is set to zero;

NumTSTentries 208 is set to zero; and the Extractor Transaction Table 210 is initialized as a list with no entries in it.

When a full database synchronization is being performed, the Updater context record flags are set by the Receiver process when the Receiver process is initialized (see Step 3, below).

If an partial database synchronization is being performed, the above discussed RDF initialization is not performed. When a partial database synchronization is being performed to regenerate a damaged volume on the RDF backup system (i.e., a volume that was previously part of the RDF configuration), that is accomplished by executing a "Delete VolumeName" command in RDFCOM, and then executing an "Add VolumeName" command.

Further, if a partial database synchronization is being performed, as indicated by the SynchSubsetVolumes parameter in the Global configuration record having a non-zero value, the RDFCOM process sets the DbSynchMode flag 574F and ReportDbSynch flag 574G to True in the context record 570 of every Updater that is participating in the partial database synchronization.

The Delete VolumeName command causes RDFCOM to delete an Updater configuration record from the RDF configuration, and to eliminate the corresponding Updater process. The Add VolumeName command causes RDFCOM to add a volume to the RDF system. More specifically, if the SynchAllVolumes flag is not set, RDFCOM processes the Add VolumeName command by:

incrementing the SynchSubsetVolumes value in the Global configuration record by 1;

creating an Updater configuration record for the added volume, and setting the SynchDbOp flag in the Updater configuration record to True;

creating an initial context record for the corresponding new Updater process, with the DbSynchMode and ReportDbSynch flags 574F and 574G both set to True; and setting the SynchDbOp flag to True in the Extractor configuration record.

Step 3 Begin Extracting Audit Required To Fix the Fuzzy Database that will be Created Next, RDF is started with the Updaters turned off, using the following RDFCOM command:

Start RDF, Update Off

As a result, all pertinent audit is shipped to the backup system and stored in the relevant image trails by the Receiver process, but is not applied to the backup database.

If a full database synchronization is being performed, as indicated by SynchAllVolumes being set to True in the Global configuration record 181A, when the Receiver process is started it's volatile initialization procedure inspects the global and extractor configuration records, creates an Updater context record for each defined backup volume, and sets the DbSynchMode and ReportDbSynch flags 574F and 574G in each Updater context record to True.

Figure 11A:
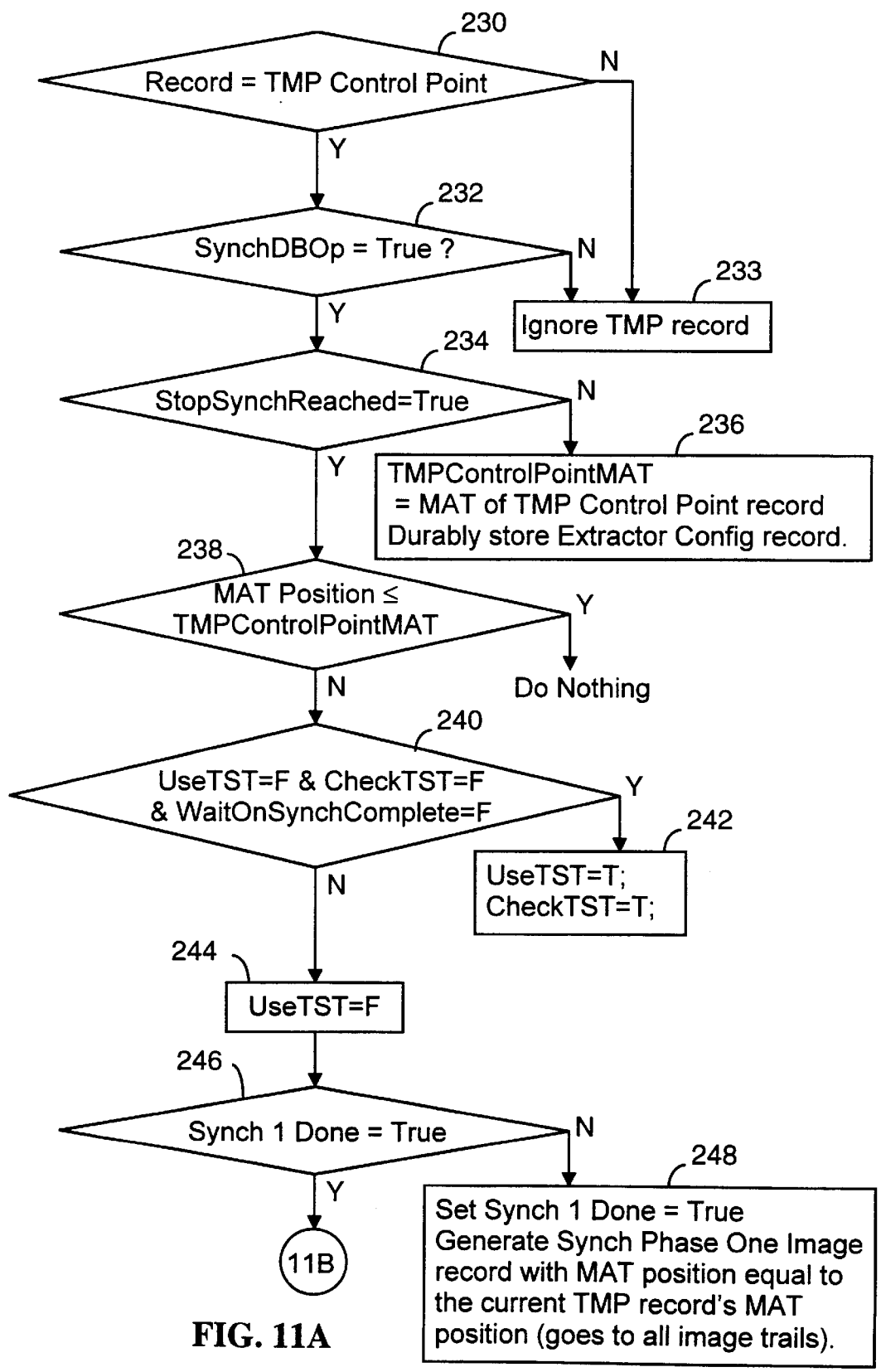
FIGS. 11A, 11B and 11C depicts the steps performed by the Extractor process to process TMP control point records during database synchronization in a preferred embodiment of the present invention.

Referring to FIG. 11A, when the RDF system is started, each TMP control point record is processed (step 230) by the Extractor process to determine the phase of the database synchronization process that is being performed. The first step of the TMP control point record processing is to check the SynchDbOp flag of the Extractor process (step 232). If the SynchDbOp flag is not set, a database synchronization process is not being performed and the TMP record is ignored (step 233). If the SynchDbOp flag is set (step 232-Y), the StopSynchReached flag is checked.

The StopSynchReached flag is set by RDFCOM when the process of making a fuzzy copy of the database volumes to be synchronized has been completed (see FIG. 11C), as discussed below with reference to Step 4 of the database synchronization process.

If the StopSynch Reached flag is not set, the fuzzy copy of the database volumes has not yet been completed. The TMPControlPointMAT parameter (in the Extractor configuration record) is set to the MAT position of the TMP control point record being processed, and the Extractor configuration record is durably stored to disk (step 236). The TMPControlPointMAT parameter is used to keep track of the position of the last TMP control point record before the completion of the fuzzy copy generation step. The TMPControlPointMAT parameter is updated to the position of each successive TMP control point record processed by the Extractor until the StopSynchReached flag is set. As a result, the Extractor maintains context information on disk (in the Extractor configuration record 183A) about the extraction operation it is performing, so that it can recover from (and resume the database synchronization operation after) network failures, systems crashes, and STOP RDF commands.

The purpose of step 238 is to handle failures and restarts of the Extractor process in the middle of performing a database synchronization. When the Extractor restarts it gets a restart MAT position from the Receiver process and starts processing audit records from that restart MAT position. If the next TMP control point record processed by the Extractor is at or before the TMP MAT position stored in the TMPControlPointMAT parameter, the Extractor ignores that TMP control point record (because the Extractor has previously processed this TMP control point record). As a result, the Extractor will only process TMP control point records not previously processed.

Upon restart of the Extractor in db-synch mode, if the restart position reported by Receiver is after the TMPControlPointMAT, the Extractor restarts (i.e., begins processing audit records) at the TMPControlPointMAT position. This makes sure the Extractor always builds the exact same E-TST and sends the exact same sequence of image records to the backup system.

Figure 12A:
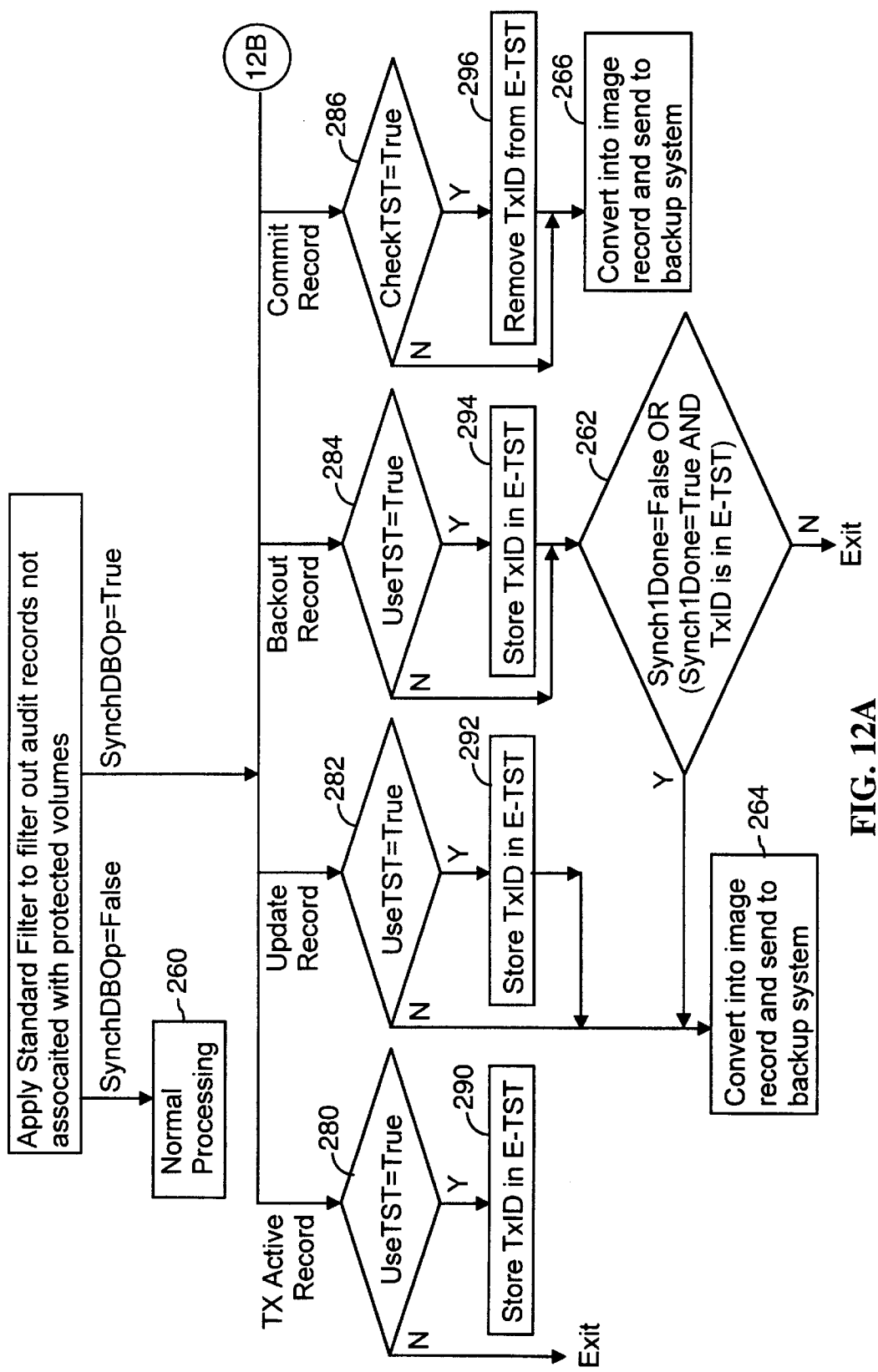
FIGS. 12A and 12B depicts the steps performed by the Extractor process to process records other than TMP control point records during database synchronization in a preferred embodiment of the present invention.
Figure 12B:
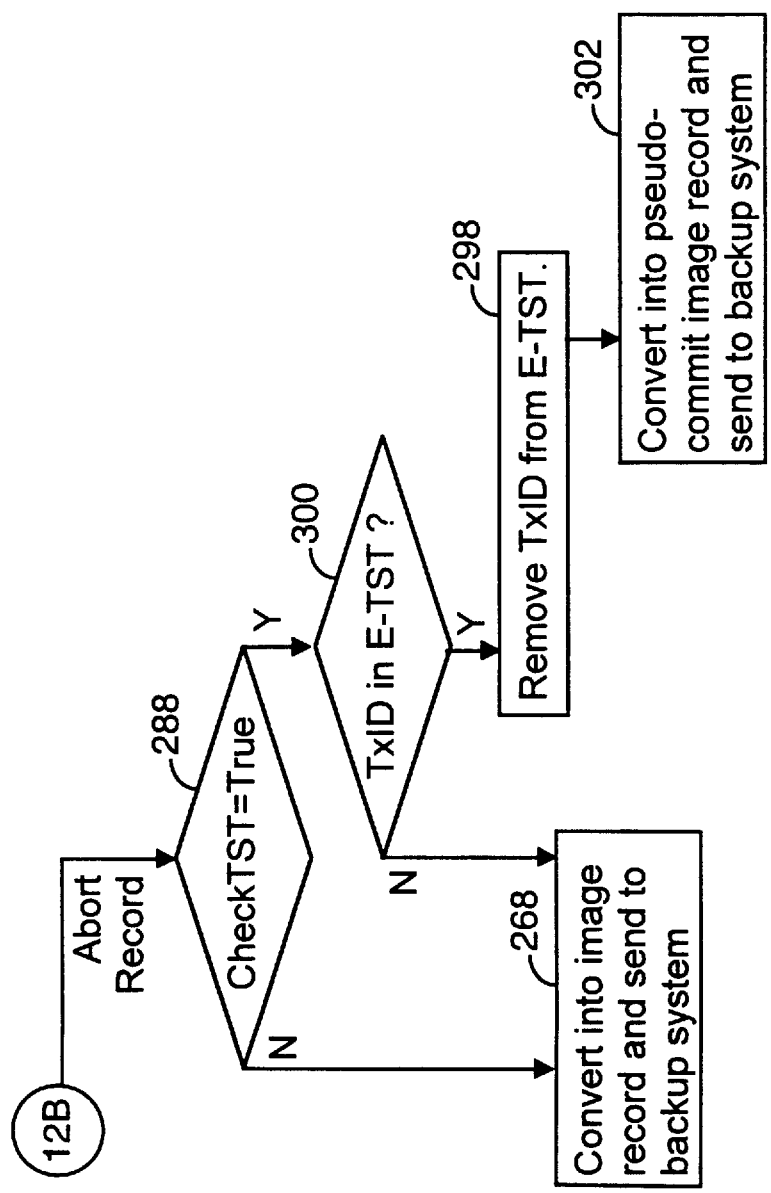

Referring to FIGS. 12A and 12B, when RDF is started, the SynchDbOp flag in the Extractor's configuration record causes the Extractor process to operate in a special database synchronization mode, called db-synch mode. This is different from its normal mode of operation (step 260) where the Extractor filters out all backout-generated audit (i.e., it does not extract and send to the backup system audit records for undoing changes previously made to the primary database). Backout-generated audit is normally not sent to the backup system because the Updaters normally only apply audit for committed transactions. When operating in db-synch mode, the Extractor no longer filters out backout-generated audit. Rather, it sends all audit (i.e., all update and backout audit for the protected volumes, as well as all commit and abort audit records) to the backup system.

More specifically, while the Synch1Done flag is False (i.e., before phase one of the database synchronization procedure is finished) (step 262), each backout audit record is converted into an image record and sent to the remote backup system (step 264). Similarly, each update, commit and abort audit record is converted into an image record and sent to the remote backup system (steps 264, 266 and 268, respectively).

Because the fuzzy database copy is generated in the next step (step 4) of the database synchronization protocol while the databases are being updated by applications, the RDF Extractor must pick up any audit reflecting change being made to the protected database volumes while the fuzzy copy is being generated. For example, if the fuzzy copying of a given file has completed all records whose primary key starts with "A", and if an application subsequently updates a record whose key starts with "A", then the fuzzy copy will not have that updated record. Therefore RDF must be apply the same update to the corresponding record of the database copy when it is restored on the backup system to make this record consistent with the primary database.

Additionally, the fuzzy database copying operation may pick up data that has been modified by transactions that subsequently abort. In such a case, the update must be undone on the backup system to make this record consistent with the primary database. Because backout-generated audit is sent to the backup system, the backout audit is available for the Updaters to perform the "undo's" for such transactions against the backup database. Similarly, if the fuzzy copy has picked up a copy of a record, but the transaction that created the record later aborts, the backout audit for the aborted transaction must be sent to the backup system so that the record will be removed from the backup database.

Step 4 Generate Fuzzy Copy of Database

A fuzzy copy of the entire database, or of the subset of protected volumes that are being synchronized, is generated by creating a set of empty files and loading the data for the volumes being synchronized into those files using a command (or a set of command options) that allows the load to be performed without impacting applications that may be updating that database. In the Tandem NonStop system, the appropriate command would be either FUP Load or SQLCI Load with the SHARE option. This is called a shared load operation, because access to the primary database is shared by the load procedure with the applications that are performing transactions against the primary database.

Other methods of generating a fuzzy database copy include: (A) performing a backup/restore operation, with shared access to the primary database so as to not interfere with applications running on the primary system, and (B) detaching a mirrored disk drive and reviving the mirrored disk at the backup system. If a large bandwidth channel is available between the primary and backup system, the files can be created on the backup system and loaded remotely onto the backup system. Otherwise, they should be created on the primary system and loaded there. Because a shared load operation copies data into the target files/tables irrespective of transactions and locks, when the operation has completed, the resulting files represent a fuzzy copy of the database on the primary system.

Note that because the Extractor is not filtering out backout-generated audit, the Updaters will eventually be able to eliminate the fuzzy nature of the backup database. Also note that the order of steps 3 and 4 can be reversed without consequence.

Step 5 Extractor Changeover to Synchronization Phase Two

When the fuzzy database copy operation has completed, the Extractor process must be told so that it can determine when to resume its normal mode of operation wherein it filters out all backout-generated audit. A second significant issue, however, is that the fuzzy copy operation may have copied data associated with transactions that have still not been resolved to either a commit or abort state when the fuzzy copy operation completed. Therefore, the Extractor must be on the lookout for such transactions and, for any that subsequently abort, it must send the backout-generated audit to the backup system, as well as transform the abort record into a pseudo-commit record. Finally, it must generate two special RDF image records that are key to the RDF Updater processes, as will be discussed further below.

To set these three tasks in motion, a new RDFCOM: StopSynch command is issued when the fuzzy copy operation of STEP 4 has completed, and the Extractor's relative time delay between audit records being generated by TMF and being processed by the Extractor is zero or very close to zero (i.e., the Extractor is caught up with TMF). In other words, the StopSynch command must be issued only when it is known that the Extractor's current MAT position is after the MAT position where TMF was writing when the fuzzy copy operation completed.

The StopSynch RDFCOM command causes the following steps to be performed by the Extractor process:

Upon receipt of the StopSynch message, the Extractor sets the StopSynchReached flag in the Extractor configuration record to True (see FIG. 11C) to indicate that the fuzzy copy operation is complete. Referring to FIG. 11A, when the next TMP control point record is encountered, the Extractor will pass through steps 230, 232, 234-Y and 238 to reach test step 240. At step 240, it determines that use of the Extractor's transaction table has not yet begun because the UseTST and CheckTST flags will both be False and the WaitOnSynchComplete flag will also be False. The Extractor therefore sets the UseTST and CheckTST flags to True to enable use of the Extractor transaction table.

Referring to FIGS. 12A and 12B, the Extractor generates a list (called the Extractor transaction table, or the E-TST) of all live transactions encountered over the next TMP control point interval that have not yet committed or aborted. Such transactions could have modified the database during the fuzzy copy operation. In particular, because the UseTST flag is True (see steps 280, 282, 284, 286, 288), the transaction identifier (TxID) of all active transactions are added to the Extractor transaction table (steps 290, 292, 294). That is, whenever a "Tx active," update, or backout audit record is processed by the Extractor while the UseTST flag is True, the transaction ID from the audit record is added to the Extractor transaction table if that transaction ID is not already stored in the Extractor transaction table. In addition the NumTSTentries parameter 208 is incremented by 1, to update the current number of entries in the Extractor transaction table.

When the Extractor encounters a commit/abort record for a transaction while the CheckTST flag is True (steps 286, 288), if the transaction's ID is on its transaction list (E-TST), it removes that transaction ID from its transaction list (steps 296, 298) and the NumTSTentries parameter 208 is decremented by 1, to update the current number of entries in the Extractor transaction table.

For any data audit (i.e., update and backout records) encountered that is associated with a transaction ID listed in the Extractor's pending transaction table (step 262), the Extractor does not filter out backout-generated audit (i.e., a corresponding image record is generated and sent to the remote backup system, step 264). Since the transactions listed in the Extractor transaction table may have modified the protected database during the load operation, the backout audit for each such transaction that aborts needs to sent to the RDF backup system so that those database modifications will be "undone" from the loaded database on the RDF backup system. Backout-generated audit for transactions not listed in the Extractor's transaction table are filtered out and not set to the backup system.

For any abort audit record whose transaction ID is listed in the Extractor transaction table (step 300), the Extractor (A) removes the transaction ID from the Extractor transaction table (step 298), and (B) generates an image record where the abort transaction state is changed to a "pseudo-commit" transaction state (step 302). The RDF backup system treats pseudo-commit records as being the same as a commit record.

Figure 11B:
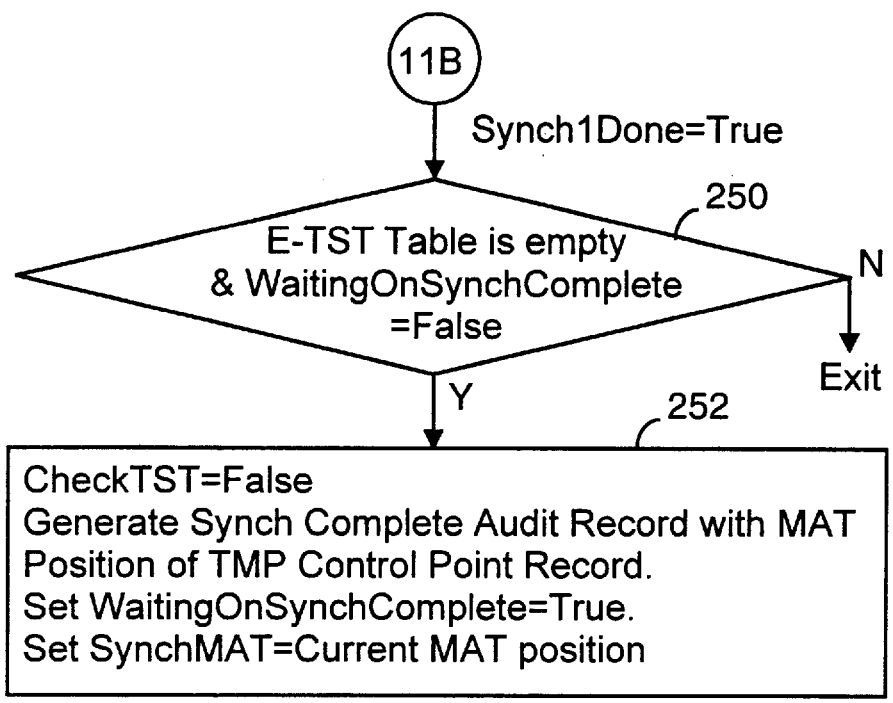
Figure 11C:
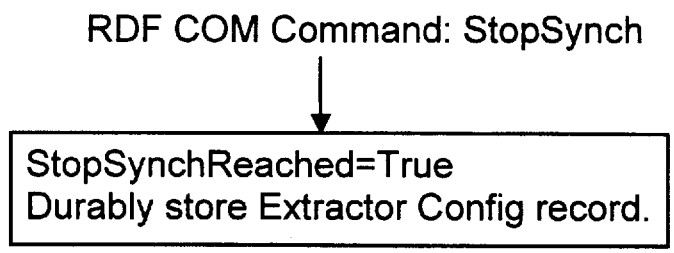

When the list of live transactions becomes empty, i.e., when NumTSTentries 208 is equal to zero, the Extractor generates a special "Synch Complete" image record that will be stored in all image trails by the Receiver process (see FIG. 11B, steps 250, 252).

More specifically, referring to FIGS. 11A and 11B, at the next TMP control point after the TMP control point at which the UseTST and CheckTST flags are set to true (step 242), step 240 will yield control to its "N" output path. As a result, the UseTST flag will be set to False (step 244);

the Synch1Done flag is tested at step 246 and then set to True at step 248; and a special "Synch Phase One" image record is transmitted to the backup system's Receiver process (step 248), which in turn stores it in all the image trails of the backup system. The MAT position assigned to the "Synch Phase One" image record is the MAT position of the TMP control point record being processed. The Synch Phase One image record marks the end of phase one of the synchronization process and the beginning of phase two (see FIGS. 8A and 8B).

Referring to FIGS. 8A, 12A and 12B, new transaction IDs are only added to the Extractor transaction table for one TMP control point period, which is sometimes called "the critical control period". After that one TMP control point period, the UseTST flag is disabled (set to False) to prevent the Extractor process from adding any further transaction IDs to that table. However, the CheckTST flag is left equal to True, so that transaction IDs are removed from the Extractor transaction table (steps 286, 288, 296 and 298) when the corresponding commit/abort records for those transactions are processed by the Extractor.

Referring to step 250 of FIG. 11B, when the Extractor processes a TMP control point record and the transaction table is empty and the WaitingOnSynchComplete flag is False (step 250-Y), the Extractor performs the following actions (step 252):

sets the CheckTST flag to False, to stop all use of the now empty Extractor transaction table;

generates and sends to the remote backup system a special "Synch Complete" image record that will be stored by the Receiver process in all image trails by the Receiver process; the Synch Complete image record is assigned a MAT position of the TMP control point record being processed when this image record is generated;

sets the WaitingOnSynchComplete flag to True, to indicate that the Extractor has finished its part of the database synchronization process, except for a final synchronization completion procedure (see discussions of Step 10 and FIG. 13A, below) that is executed when the Receiver process on the remote backup system durably stores all the image records required to fully synchronize the backup database with the primary database; and sets the SynchMAT parameter to the current TMP control point record's MAT position.

It is noted here that the Receiver process on the remote backup system reports a restart position to the Extractor process every time it acknowledges receiving a buffer of image records. The restart position is the MAT position of the last audit/image record durably stored to disk when the Receiver last saved its context record.

Once the remote backup system reports to the Extractor a restart position that is at or after the SynchMAT position (i.e., after the MAT position of the Synch Complete image record), that indicates that the remote backup system has durably stored in the image trail files all the image records required to synchronize the backup database with the primary database. In other words, once the Synch Complete image record is durably stored in all image trails, and the Receiver's restart MAT position (as determined by the MAT positions indicated by the image trail context records) that is past the Synch Complete image record's MAT position, the Extractor process on the primary system can finish up its part of the database synchronization process. See the discussion of Step 10, which in most cases will be completed before Step 6 is performed.

Step 6 Move Fuzzy Files to Backup System

If the duplicated files were created on the primary system, these files are moved to the backup system (using Backup/Restore, Mirror/Revive, Fup Dup, etc.), and all the TMF "audit flags" are turned off (i.e., on the backup system these files are "not audited" because changes to them are not reflected in an audit trail). Note, if the files on the primary system are (or include) SQL files, the associated catalogs must be created on the backup system manually.

This Step 6, moving the duplicated files, is preferably performed at the same time that step 5 is being performed, after the Stop Synch command has been issued.

Step 7 Restart Updaters on Backup System in Database Synchronization Mode (Synchronization Phase One)

The RDFCOM: START UPDATE command is used to start operation of the Updaters on the backup system. When each Updater starts, it detects from its context record if it is operating in the db-synch mode. If it is operating in db-synch mode, this brings about a significant change in how it does its work. Normally, each Updater only applies committed transactions to the backup database, and to learn what was committed and aborted, the Updater must send a message to the Receiver to obtain the status of the associated transactions.

Figure 10:
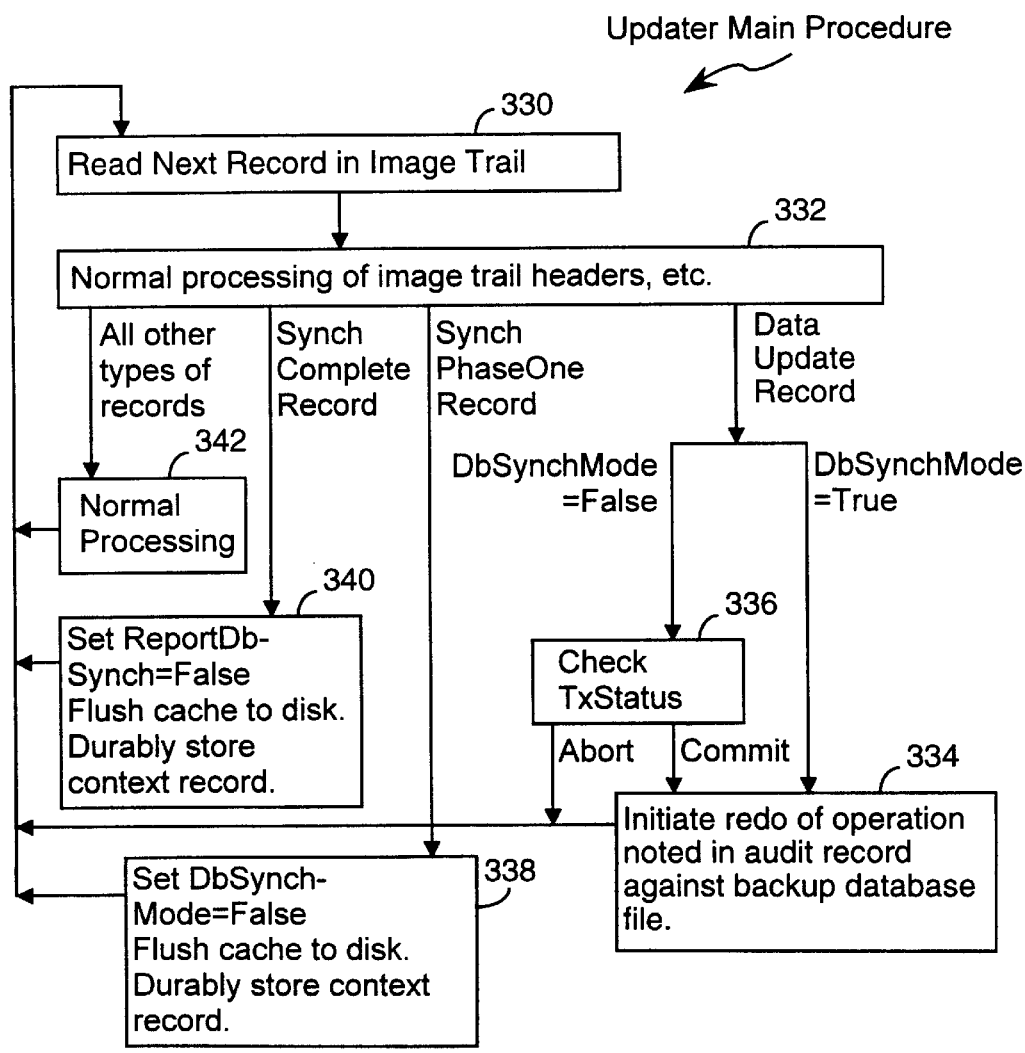
FIG. 10 depicts the steps performed by each Updater process during database synchronization in a preferred embodiment of the present invention.

Referring to FIG. 10, in db-synch mode (which is active when the DbSynchMode flag in the Updater's context record is True), each Updater applies all audit associated with the volume it is protecting, irrespective of transaction's commit/abort status. It can do this because the Extractor is sending all audit, including backout-generated audit, to the backup system. Thus, the Updater performs the undo operations on the backup database by sending backout-generated audit for logical redo to the disk process.

More specifically, the main procedure of the Updater process continuously performs an image record processing loop, pausing only when it reaches a limit position set by the Receiver process. The procedure reads the next record in the image trail that is applicable to the database volume protected by the Updater (step 330). The processing of image trail headers (step 332) and the like is not changed by the database synchronization process.

If the image record being processed is a data update record and the Updater is not in db-synch mode or the Updater is in the second phase of the database synchronization process, the status of the transaction for the data update is checked (step 336). If the transaction status is "abort", the data update is not applied to the backup database, and if the transaction status is "commit" it is applied to the backup database (step 334). If the Updater is in db-synch mode and the Updater is in the first phase of the database synchronization process, the status of the transaction for the data update is not checked. Instead, the data update is applied to the backup database regardless of whether the transaction was committed or aborted (step 334).

While in phase one of the database synchronization process, the Updater applies all audit, including backout audit, to the backup database, so as to remove the fuzzy nature of the backup database.

If the image record being processed is a Synch Phase One image record, the Updater resets the DbSynchMode parameter 574F in its context record parameter to False to indicate that it is now in the second phase of the database synchronization process (step 338). The Updater also flushes all database updates in cache memory to disk (to ensure that all the phase one database updates and corrections have been durably stored) and durably stores its context record to disk (step 338).

If the image record being processed is a Synch Complete image record, the Updater resets its ReportDbSynch flag to False (step 340) to indicate that it has now completed the database synchronization process for the database volume protected by that Updater. The Updater also flushes all database updates in cache memory to disk (to ensure that all the phase two database updates and corrections have been durably stored) and durably stores its context record to disk (step 340).

All other types of image records are processed in the same way (step 342) as when a database synchronization process is not being performed.

The step of performing database update redo operations without checking for transaction status during the first phase of the database synchronization process is vital to efficient performance of the database synchronization procedure. When the Updaters run in normal mode, they only apply committed transactions and must therefore send messages to the Receiver to determine the outcome of a given transaction. When operating in db-synch mode, however, because the Updaters apply all audit to the backup database volumes, irrespective of the outcome of the transactions, the Updaters no longer need to communicate with the Receiver. As a result, Updater performance will be as fast as it can be, which enables the database synchronization operation to complete as rapidly as possible.

Because the Updaters are applying update and backup audit records against a fuzzy copy of the database, file system errors will occur for deleting records that do not exist, inserting records that already exist, and making updates to database records that have are already been made to the backup database (e.g., before those records were copied to the backup database). Therefore, to prevent meaningless error messages, whenever an Updater is in db-synch mode, it instructs its associated disk process to ignore such errors. Thus, meaningless disk error messages are prevented, and an additional side effect occurs - the disk process can process the audit data much quicker than it would otherwise, because it ignores the above mentioned disk error messages.

The Updater display for the RDFCOM: STATUS RDF command is also changed. Whenever ReportDbSynch is True, the Updater display shows that its state is "synch-in-progress." Thus the user can determine that the Updater has not yet completed its db synch operation.

Step 8 Updater Processes: Synchronization Phase Two

As each Updater encounters the "Synch Phase One" image record in the image trail, it logs a message saying that it has completed phase one of the database synchronization process. Because the "Synch Phase One" record was generated by the Extractor after the fuzzy copy generation operation completed and because the Extractor has resumed its normal operations, the Updater resumes its normal operations wherein it applies only committed and pseudo-committed transactions to the backup database.

Referring to FIG. 10, each Updater processes the "Synch Phase One" image record in its image trail by resetting its DbSynchMode parameter to False (step 338), to indicate that it is now in the second phase of the database synchronization process. This causes the Updater to resume checking the transaction status (step 336) for each data update image record processed by the Updater before applying the data update to the backup database. The Updater also flushes all database updates in cache memory to disk (to ensure that all the phase one database updates and corrections have been durably stored) and durably stores its context record to disk (step 338).

Note that for those transactions that were active during the fuzzy copy generation operation but were aborted after the Synch Phase One image record is generated, the Extractor will have sent all backout-generated audit for such transactions to the backup system, and it will have changed the transaction abort status record to a pseudo-commit record. The Receiver regards a pseudo-commit as a bonafide commit. Thus the Updater will receive the backout-generated audit for these transactions in its image trail, and when it asks the Receiver for their status, the Receiver will reply that the transactions committed, thereby causing the Updater to apply the backout audit, which will bring about the undo on the backup database.

Step 9 Updater Processes: Completion of Synchronization

As each Updater encounters the "Synch Complete" image record in the image trail, it resets the ReportDbSynch flag 574G (see FIG. 7) in its context record 570 to False (see step 340 of FIG. 10), flushes all database updates in cache memory to disk (to ensure that all the phase two database updates and corrections have been durably stored), durably stores its context record, and logs a message saying that it has completed its work on the database synchronization operation. Additionally, its STATUS RDF display returns to normal, thereby indicating that the database synchronization operation has been completed for the associated protected volume.

When all the Updaters have read and processed the Synch Complete image record, the database synchronization process is completed at the remote backup system.

Step 10 Synchronization Completion at Primary System

When the Extractor sends the "Synch Complete" image record to the remote backup system, it cannot immediately reset the Global, Updater and Extractor configuration records to turn off all the database synchronization parameters, because a failure in the backup system might require the Extractor to re-transmit audit information needed for the database synchronization operation. In fact, the Extractor waits until the Receiver process on the remote backup system sends a message indicating a restart MAT position that is after the MAT position associated with the "Synch Complete" image record. It then calls a "Handle Synchronization Completion" procedure, described below with respect to FIGS. 13A and 13B, to turn off all the database synchronization parameters in the configuration records.

Figure 13A:
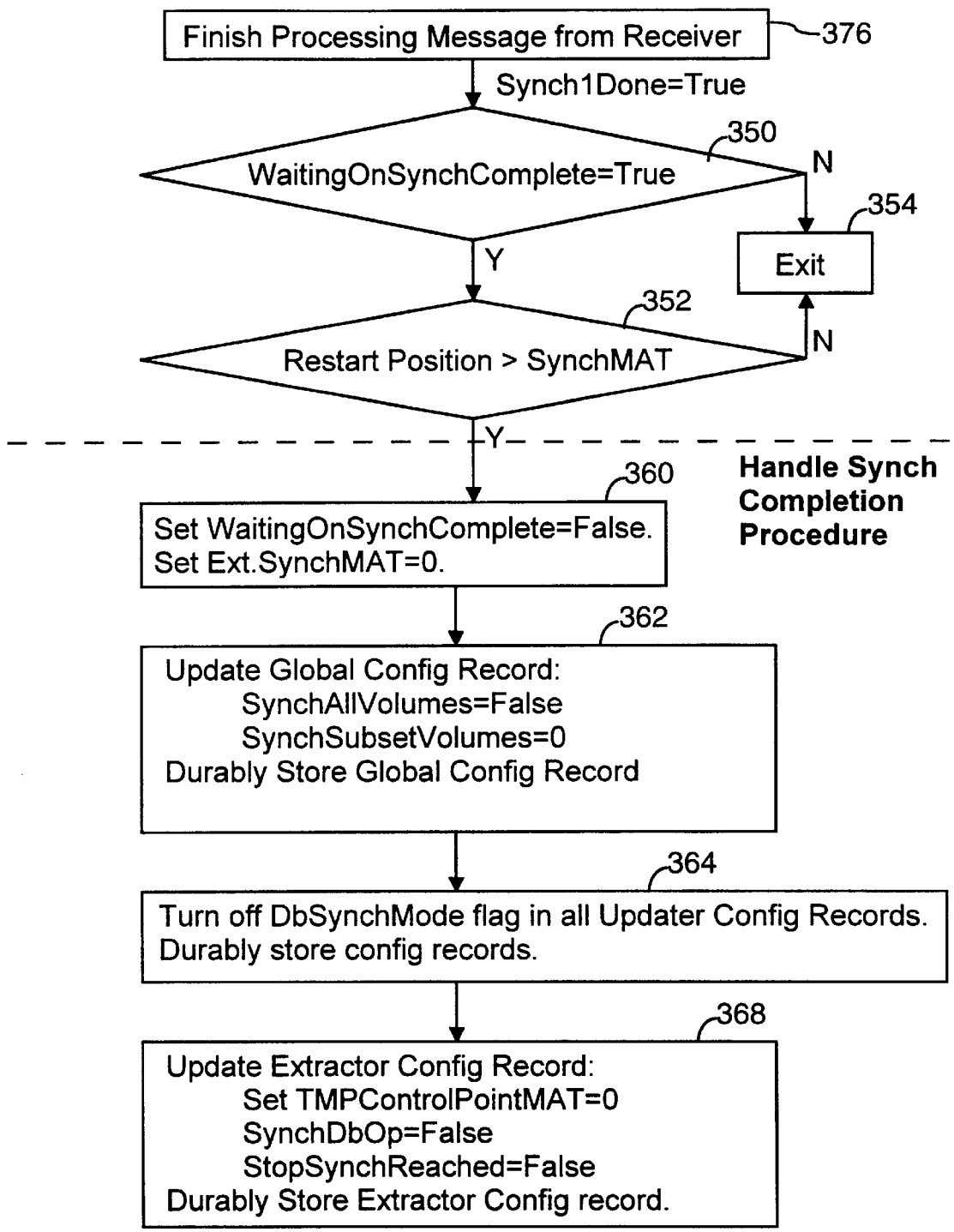
FIGS. 13A and 13B depicts the steps performed by the Extractor process at the completion of the database synchronization protocol in a preferred embodiment of the present invention.

Referring to FIG. 13A, an extension has been added to the Extractor procedure for processing reply messages received from the Receiver process. At step 376 the Extractor processes each message buffer reply message from the Receiver. Each reply message includes a MAT restart position. The MAT restart position is the MAT position of the last audit record durably written to an image trail file prior to the last time the Receiver saved its context record.

The restart MAT position represents the MAT position of the oldest audit record the remote backup system would need to receive in the event of a failure of the backup system in order to remain synchronized with the primary database.

If the WaitingOnSynchComplete flag is False (step 350), or the MAT restart position reported by the Receiver reply message is less than (i.e., before) the SynchMAT position (step 352), the procedure exits (step 354) because the remote backup system has not yet indicated completion of the database synchronization process.

If the WaitingOnSynchComplete flag is True (step 350-Y), and the restart position reported by the received message is later than the SynchMAT position (step 352-Y), the procedure calls the Handle Synch Completion procedure, which starts at step 360 in FIG. 13A.

Handle Synch Completion Procedure

The Handle Synch Completion procedure resets the database synchronization parameters in the global configuration record, Updater configuration records, and Extractor configuration record so as to return the RDF system back to normal operation. These configuration record parameters are reset in a specific order so that if the primary system fails and restarts in the middle of performing the Handle Synch Completion procedure, the Extractor is able to determine, when recovering from such a failure, that the Handle Synch Completion procedure began execution without finishing.

At step 360 the WaitingOnSynchComplete flag in the Extractor is reset to False, indicating that the Extractor is no longer waiting for the backup system to durably store all the audit information required for database synchronization. Also, the SynchMAT parameter is reset to zero.

This step 360 only turns off two global variables, without resetting any configuration records. As a result, if the Extractor process fails and restarts after executing step 360, but before executing step 362, the Extractor will restart processing audit information back at the TMPControlPoint-MAT position.

Next, at step 362, the Global configuration record is updated by setting SynchAllVolumes to False, and Synch- SubsetVolumes to 0, and then the updated Global configuration record is durably stored to disk.

Figure 13B:
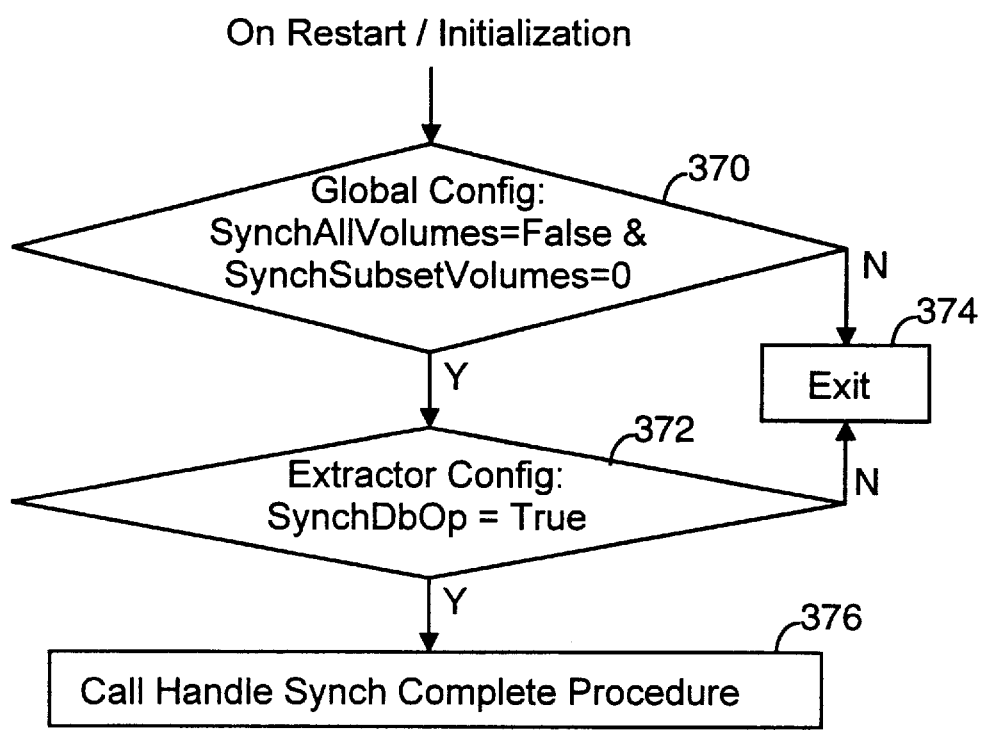

If the Extractor fails after completing step 362 but before completing step 368, and is then restarted, the Extractor's volatile initialization procedure will detect that the Global configuration parameters for database synchronization have been reset (step 370 of FIG. 13B), but that the Extractor configuration parameters for database synchronization have not been reset (step 372 of FIG. 13B). As a result, the Extractor process determines that it failed while executing the Handle Synch Complete procedure and restarts execution of that procedure. Therefore the Extractor will not reprocess all the audit information going back to the TMPControlPointMAT position. See FIG. 13B.

At step 364 the DbSynchMode flag is reset to False in all the Updater configuration records. The Updater configuration records are then durably stored to disk.

Finally, at step 368 the Extractor configuration record is updated by resetting the TMPControlPointMAT to zero, resetting the SynchDbOp flag to False and resetting the StopSynchReached flag to False. The Extractor configuration record is durably stored to disk. As explained above, if the procedure fails after step 362 but before completing step 368, the Handle Synch Complete procedure will be re-executed with reprocessing audit information.

Referring to FIG. 13B, any time the primary system fails or the Extractor process fails and is restarted, one of the recovery steps performed, after restarting and initializing the Extractor process, is to check the Global and Extractor configuration records to see if the Handle Synch Completion procedure was interrupted by a system or process failure. If the SynchAllVolumes flag is False and the SynchSubsetVolumes parameter is equal to zero (step 370-Y) and the SynchDbOp flag in the Extractor configuration record is equal to True (step 372-Y), the Handle Synch Completion procedure was interrupted by a system or process failure. As a result, the Handle Synch Completion procedure is called so as to re-execute that procedure (step 376). On the other hand, if SynchAllVolumes flag is True or the SynchSubsetVolumes parameter is not equal to zero (step 370-N), or the SynchDbOp flag in the Extractor configuration record is equal to False (step 372-N), the Handle Synch Completion procedure is not called (step 374) because it was not interrupted by a system or process failure.

Partial Database Synchronization

The typical reason files on a specific data volume need to be synchronized with the corresponding files on the primary system is because that volume has failed on the backup system. Under such circumstances, the normal, prior art, protocol is to STOP RDF, delete the volume in question from the RDF configuration, and then restart RDF. Thus one keeps all other volumes on the backup system up to date. When the problem afflicting the particular disk on the backup system has been resolved, one must stop all applications (i.e., all applications that are capable of modifying the primary database) running on the primary system, create a backup of the volume, resume applications, start RDF with update off, restore the volume at the RDF backup system, and finally turn update on. In short, while the duration of downtime for the applications is much shorter than for a complete database synchronization, one nevertheless must stop the operation of the applications for a period of time.

The methodology of the present invention for synchronizing to the entire database can also be used to resynchronize a subset of the protected volumes as well. To synchronize a subset of protected volumes, the system operator adds one or more volumes to the RDF configuration with the DbSynchMode flag set. If the volumes being synchronized are volumes that existed previously and failed on the RDF backup system, then the RDF configuration for those failed volumes must first be deleted from the RDF configuration and then added back in with the DbSynchMode flag set, or the Updater configuration records 185A (see FIG. 5) for those volumes must be modified to set the Db Synch Mode flag. The Extractor operations remain the same as described above for a full database synchronization, as do the Updater operations.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of synchronizing a backup database with a corresponding primary database, comprising the steps of:

enabling one or more application programs to perform transactions that modify the primary database;

while the transactions continue to modify the primary database, generating a fuzzy database copy of a portion of the primary database by copying the primary database portion without regard to changes being made to the primary database portion while the fuzzy copy is being generated;

installing the fuzzy database copy at a backup system;

sending to the backup system audit information representing (A) all modifications to the primary database portion made by transactions that were active while the fuzzy database copy was generated and (B) all modifications to the primary database portion made by transactions first active after the fuzzy database copy was completed; and at the backup system, receiving and applying the sent audit information to the fuzzy database copy so as to generate a synchronized backup database, by performing redos of the database modifications corresponding to the audit information sent to the backup system.

2. A method of synchronizing a backup database with a corresponding primary database, comprising the steps of:

enabling one or more application programs to perform transactions that modify the primary database;

while the transactions continue to modify the primary database, generating a fuzzy database copy of a portion of the primary database by copying the primary database portion without regard to changes being made to the primary database portion while the fuzzy copy is being generated;

installing the fuzzy database copy at a backup system;

sending to the backup system audit information representing modifications to the primary database portion made by transactions that were active while the fuzzy database copy was generated and modifications to the primary database portion made by transactions first active after the fuzzy database copy was completed;

determining when all transactions that were active while the fuzzy database copy was generated have completed by aborting or committing, and after the audit information representing the modifications to the primary database portion made by all the transactions that were active while the fuzzy database copy was generated, sending a predefined audit information message to the backup system;

at the backup system, receiving and applying the sent audit information to the fuzzy database copy so as to generate a synchronized backup database, by performing redos of the database modifications corresponding to the audit information sent to the backup system; and when all the audit information sent before the predefined audit information message has been applied to the fuzzy database copy, performing an action that indicates that the backup database has been synchronized with the primary database.

3. A method of synchronizing a backup database with a corresponding primary database, comprising the steps of:

enabling one or more application programs to perform transactions that modify the primary database;

maintaining a master audit trail of changes made to the primary database, the master audit trail including update audit records representing updates made to the database by the transactions, backout audit records representing update backouts made to the primary database when some of the transactions abort, commit records representing the ones of the transactions that commit and abort records representing the ones of the transactions that abort;

generating a fuzzy database copy of a portion of the primary database by copying the primary database portion without regard to changes being made to the primary database portion while the fuzzy copy is being generated;

installing the fuzzy database copy at a backup system;

sending audit information corresponding to audit records in the master audit trail to the backup system; the audit information sent to the backup system including audit information corresponding to all audit records, including both update and backout audit records, representing changes made to the primary database portion by the transactions while the fuzzy database copy was generated, and including audit information corresponding to all audit records representing updates made to the primary database portion by the transactions after the fuzzy database copy was generated;

at the backup system, receiving and applying the sent audit information to the fuzzy database copy so as to generate a synchronized backup database, by performing redos of the database updates corresponding to the audit information sent to the backup system, including:

for audit information corresponding to transactions that were active while the fuzzy database copy was being generated, performing redos of all database changes, including both updates and update backouts, represented by the received audit information; and for audit information corresponding to transactions that started after the fuzzy database copy was completed, performing redos of database updates represented by the received audit information for transactions that committed.

4. The method of claim 3, including:

defining a portion of the master audit trail that includes all audit records representing changes made to the primary database portion while the fuzzy database copy was being generated;

the audit information sent to the backup system including audit information corresponding to all audit records, including both update and backout audit records, in the defined portion of the master audit trail that represent changes made to the primary database portion by the transactions, and further including all audit records, including both update and backout audit records, after the defined portion of the master audit trail that represent changes made to the primary database portion by transactions for which at least one audit record is included in the defined portion of the master audit trail;

the audit information applying step including:

for audit information corresponding to each transaction for which at least one audit record was included in the defined portion of the master audit trail, performing redos of all database changes, including both updates and update backouts, represented by the received audit information; and for audit information corresponding to transactions for which there were no audit records included in the defined portion of the master audit trail, performing redos of database updates represented by the received audit information for transactions that committed.

5. The method of claim 3, wherein the fuzzy database copy generating step includes using a shared load operation so as to copy the primary database portion without regard to changes being made to the primary database portion while the fuzzy copy is being generated.

6. A distributed computer database system, comprising:

a primary computer system having a primary database stored on memory media associated with the primary computer system, application programs that modify the local database;

a backup computer system, the backup computer system having a backup database stored on memory media associated with the backup computer system;

a communication channel for sending messages between the primary computer system and the backup computer system; and means for generating a fuzzy database copy of a portion of the primary database by copying the primary database portion without regard to changes being made to the primary database portion while the fuzzy copy is being generated;

means for installing the fuzzy database copy at a backup system;

a process executed by the primary computer system that sends to the backup system audit information representing (A) all modifications to the primary database portion made by transactions that were active while the fuzzy database copy was generated and (B) all modifications to the primary database portion made by transactions first active after the fuzzy database copy was completed; and at the backup system, one or more processes for receiving and applying the sent audit information to the fuzzy database copy so as to generate a synchronized backup database, by performing redos of the database modifications corresponding to the audit information sent to the backup system.

7. A distributed computer database system, comprising:

a primary computer system having a primary database stored on memory media associated with the primary computer system, application programs that modify the local database;

a backup computer system, the backup computer system having a backup database stored on memory media associated with the backup computer system;

a communication channel for sending messages between the primary computer system and the backup computer system; and means for generating a fuzzy database copy of a portion of the primary database by copying the primary database portion without regard to changes being made to the primary database portion while the fuzzy copy is being generated;

means for installing the fuzzy database copy at a backup system;

a process executed by the primary computer system that
(A) sends to the backup system audit information representing (A1) modifications to the primary database portion made by transactions that were active while the fuzzy database copy was generated and (A2) modifications to the primary database portion made by transactions first active after the fuzzy database copy was completed; and
(B) determines when all transactions that were active while the fuzzy database copy was generated have completed by aborting or committing, and after the audit information representing the modifications to the primary database portion made by all the transactions that were active while the fuzzy database copy was generated, sends a predefined audit information message to the backup system;

at the backup system, one or more processes for receiving and applying the sent audit information to the fuzzy database copy so as to generate a synchronized backup database, by performing redos of the database modifications corresponding to the audit information sent to the backup system; and means for performing an action that indicates that the backup database has been synchronized with the primary database, the action being performed after all the audit information sent before the predefined audit information message has been applied to the fuzzy database copy.

8. A distributed computer database system, comprising:

a primary computer system having a primary database stored on memory media associated with the primary computer system, application programs that modify the local database, and a transaction manager that stores audit records in a master audit trail reflecting changes made to the primary database by transactions executed under the control of one or more application programs; each audit record having an associated audit trail position in the master audit trail;

a backup computer system, the backup computer system having a backup database stored on memory media associated with the backup computer system;

a communication channel for sending messages between the primary computer system and the backup computer system; and means for generating a fuzzy database copy of a portion of the primary database by copying the primary database portion without regard to changes being made to the primary database portion while the fuzzy copy is being generated;

means for installing the fuzzy database copy at a backup system;

an extractor process executed by the primary computer system that extracts audit records from the master audit trail and transmits the extracted audit records to the backup computer system;

the audit information transmitted to the backup computer system including audit information corresponding to all audit records, including both update and backout audit records, representing changes made to a portion of the primary database by transactions while the fuzzy database copy was generated, and including audit information corresponding to all audit records representing updates made to the primary database portion by the transactions after the fuzzy database copy was generated; and updater processes, executed by the backup computer system, for receiving and applying the transmitted audit information to the fuzzy database copy so as to generate a synchronized backup database, by performing redos of the database updates corresponding to the audit information transmitted to the backup system, including:
for audit information corresponding to ones of the transactions that were active while the fuzzy database copy was being generated, performing redos of all database changes, including both updates and update backouts, represented by the received audit information; and
for audit information corresponding to transactions started after the fuzzy database copy was generated, performing redos of database updates represented by the received audit information for transactions that committed.

9. The distributed computer database system of claim 8, wherein the extractor process includes means for defining a portion of the master audit trail that includes all audit records representing changes made to the primary database portion while the fuzzy database copy was being generated;

the audit information transmitted to the backup computer system including audit information corresponding to all audit records, including both update and backout audit records, in the defined portion of the master audit trail that representing changes made to the primary database portion by the transactions, and further including all audit records, including both update and backout audit records, after the defined portion of the master audit trail that represent changes made to the primary database portion by transactions for which at least one audit record is included in the defined portion of the master audit trail;

the updater processes including audit information applying means for applying audit information to the backup database by:
for audit information corresponding to each transaction for which at least one audit record was included in the defined portion of the master audit trail, performing redos of all database changes, including both updates and update backouts, represented by the received audit information; and
for audit information corresponding to transactions for which there were no audit records included in the defined portion of the master audit trail, performing redos of database updates represented by the received audit information for transactions that committed.

10. The distributed computer database system of claim 8, wherein the means for generating a fuzzy database copy includes means for using a shared load operation so as to copy the primary database portion without regard to changes being made to the primary database portion while the fuzzy copy is being generated.

* * * * *